US006377262B1

(12) United States Patent
Hitchcock et al.

(10) Patent No.: US 6,377,262 B1
(45) Date of Patent: Apr. 23, 2002

(54) RENDERING SUB-PIXEL PRECISION CHARACTERS HAVING WIDTHS COMPATIBLE WITH PIXEL PRECISION CHARACTERS

(75) Inventors: Gregory C. Hitchcock, Woodinville; Beat Stamm; Claude Betrisey, both of Redmond; Matt Conway, Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/546,062

(22) Filed: Apr. 10, 2000

Related U.S. Application Data

(63) Continuation-in-part of application No. 09/364,364, filed on Jul. 30, 1999, now Pat. No. 6,282,327.

(51) Int. Cl.[7] .................................................. G09G 5/00
(52) U.S. Cl. ....................... 345/467; 345/468; 345/469; 345/469.1; 345/470; 345/471; 345/472; 345/472.1; 345/472.2
(58) Field of Search ................................. 345/611, 612, 345/613, 614, 660, 669, 671, 467, 468, 469, 469.1, 470, 472, 472.1, 472.2

(56) References Cited

U.S. PATENT DOCUMENTS

| | | | |
|---|---|---|---|
| 4,136,359 A | 1/1979 | Wozniak | 358/17 |
| 4,217,604 A | 8/1980 | Wozniak | 358/16 |
| 4,278,972 A | 7/1981 | Wozniak | 340/703 |
| 5,057,739 A | 10/1991 | Shimada e al. | 313/477 R |
| 5,122,783 A | 6/1992 | Bassetti, Jr. | 340/701 |
| 5,254,982 A | 10/1993 | Feigenblatt et al. | 345/148 |
| 5,298,915 A | 3/1994 | Bassetti, Jr. et al. | 345/149 |

(List continued on next page.)

OTHER PUBLICATIONS

Abram, G. et al. "Efficient Alias-free Rendering using Bit-masks and Look-Up Tables" *San Francisco*, vol. 19, No. 3, 1985 (pp. 53–59).

Ahumada, A.J. et al. "43.1: A Simple Vision Model for Inhomogeneous Image-Quality Assessment" *1998 SID*.

Barbier, B. "25.1: Multi-Scale Filtering for Image Quality on LCD Matrix Displays" *SID 96 Digest*.

Barten, P.G.J. "P-8: Effect of Gamma on Subjective Image Quality" *SID 96 Digest*.

Beck. D.R. "Motion Dithering for Increasing Perceived Image Quality for Low-Resolution Displays" *1998 SID*.

(List continued on next page.)

*Primary Examiner*—Matthew Luu
*Assistant Examiner*—Daniel J Chung
(74) *Attorney, Agent, or Firm*—Workman, Nydegger & Seeley

(57) ABSTRACT

Image data processing and image rendering methods and systems whereby images are displayed on display devices having pixels with separately controllable pixel sub-components. Images, such as text characters, are displayed on a display device with at least some features being rendered with sub-pixel precision. The displayed advance width of a character displayed with sub-pixel precision is compatible with the advance width of the character if it had instead been displayed with a conventional full pixel precision rendering process. Thus, characters are displayed with sub-pixel precision, resulting in improved resolution and readability, while the advance width and the corresponding size and spacing of the characters and the overall formatting of the document remains the same compared to documents and characters rendered using conventional full pixel precision processes. The sub-pixel precision rendering process also involves mapping spatially different sets of one or more samples of the image data to individual pixel sub-components rather than to full pixels.

34 Claims, 14 Drawing Sheets

U.S. PATENT DOCUMENTS

| | | | |
|---|---|---|---|
| 5,301,267 A | * 4/1994 | Hassett et al. | 395/150 |
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,467,102 A | 11/1995 | Kuno et al. | 345/1 |
| 5,543,819 A | 8/1996 | Farwell et al. | 345/150 |
| 5,548,305 A | 8/1996 | Rupel | 345/150 |
| 5,555,360 A | 9/1996 | Kumazaki et al. | 395/143 |
| 5,594,854 A | * 1/1997 | Baldwin et al. | 395/141 |
| 5,633,654 A | 5/1997 | Kennedy, Jr. et al. | 345/114 |
| 5,684,510 A | * 11/1997 | Brassell et al. | 345/143 |
| 5,689,283 A | 11/1997 | Shirochi | 345/132 |
| 5,710,880 A | * 1/1998 | Howlett et al. | 395/168 |
| 5,767,837 A | 6/1998 | Hara | 345/152 |
| 5,821,913 A | * 10/1998 | Mamiya | 345/88 |
| 5,847,698 A | 12/1998 | Reavey et al. | 345/173 |
| 5,860,074 A | * 1/1999 | Rowe et al. | 707/526 |
| 5,894,300 A | 4/1999 | Takizawa | 345/115 |
| 5,943,063 A | * 8/1999 | Dowling | 345/471 |
| 5,949,643 A | 9/1999 | Batio | 361/681 |
| 5,963,185 A | 10/1999 | Havel | 345/83 |
| 6,104,375 A | * 8/2000 | Lam | 345/150 |

OTHER PUBLICATIONS

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Designs*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al., "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al., "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cutting Edge Display Technology—The Diamond Vision Difference" www.amasis.com/diamondvision/technical.html, Jan. 12, 1999.

"Exploring the Effect of Layout on Reading from Screen" http://fontweb/internal/ repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/screenlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution" http://www.microsoft.com/typography/tools/trlalr.htm?fname=%20fsize.

"The TrueType Rasterizer" http://www.microsoft.com/typography/what/raster.htm?fname=%20&fsize, Jun. 30, 1997.

"TrueType fundamentals" http://www.microsoft.com/OTSPEC/TTCHO1.htm?fname=%20fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

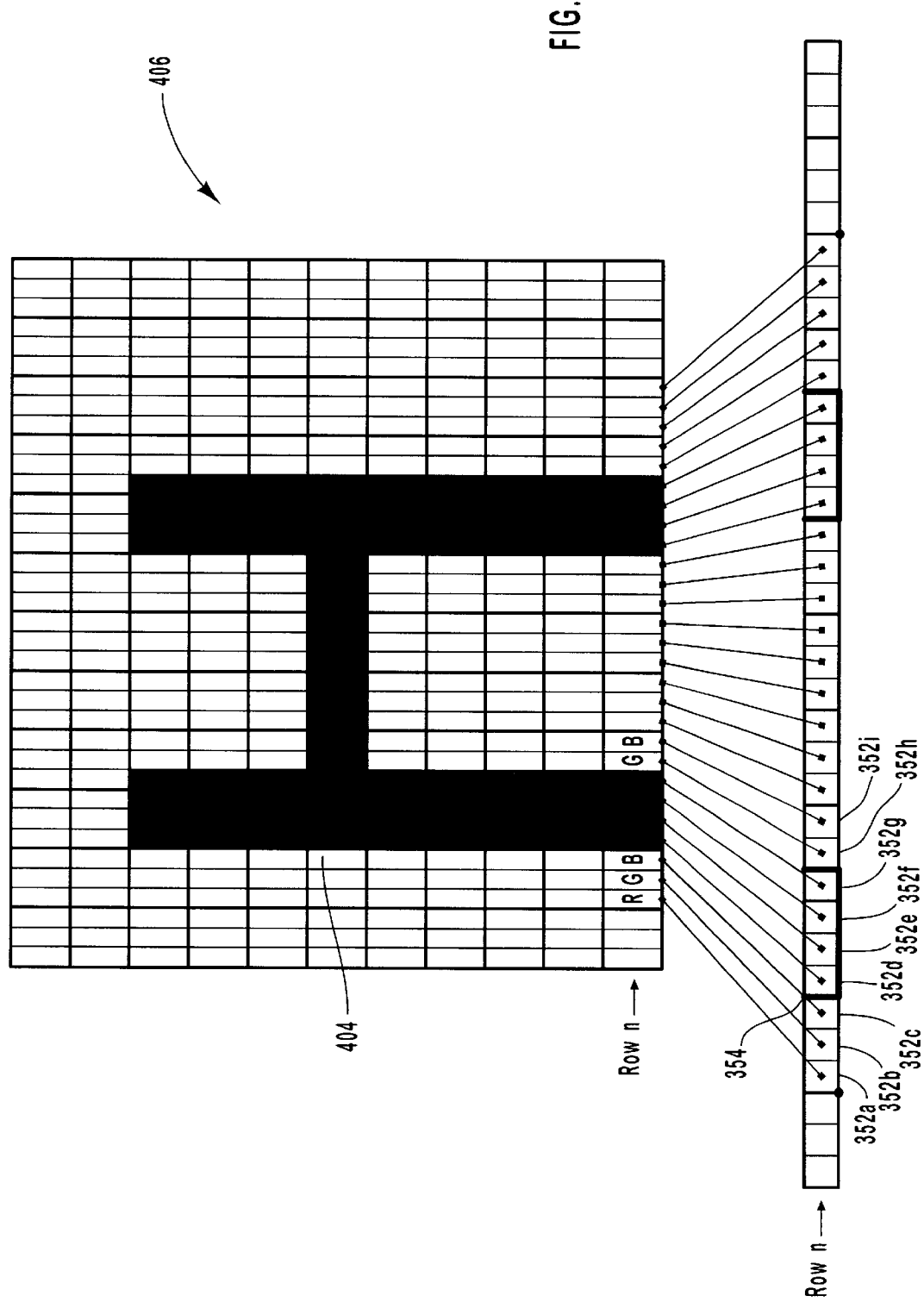

RENDERING SUB-PIXEL PRECISION CHARACTERS HAVING WIDTHS COMPATIBLE WITH PIXEL PRECISION CHARACTERS

BACKGROUND OF THE INVENTION

1. Related Application

This application is a continuation-in-part of U.S. patent application Ser. No. 09/364,364, filed Jul. 30, 1999, now U.S. Pat. No. 6,282,327 which is incorporated herein by reference.

2. The Field of the Invention

The present invention relates to rendering images on display devices having pixels with separately controllable pixel sub-components. More specifically, the present invention relates to rendering characters on display devices using pixel sub-component precision, while preserving the same advance width of the characters that would be obtained by rendering the characters using full pixel precision processes.

3. The Prior State of the Art

With the advent of the information age, individuals worldwide spend substantial amounts of time viewing display devices. Flat panel display devices, such as liquid crystal display (LCD) devices, and cathode ray tube (CRT) display devices are two of the most common types of display devices used to render text and graphics. CRT display devices use scanning electron beams that are controlled in an analog manner to activate phosphor positioned on a screen. A pixel of a CRT display device that has been illuminated by the electron beams consists of a triad of dots, each of a different color. The dots included in a pixel are controlled together to generate what is perceived by the user as a single point or region of light having a selected color defined by a particular hue, saturation, and intensity. The individual dots in a pixel of a CRT display device are not separately controllable. CRT display devices have been widely used in combination with desktop personal computers, workstations, and in other computing environments in which portability is not an important consideration.

LCD display devices, in contrast, have pixels consisting of multiple separately controllable pixel sub-components. Typical LCD devices have pixels with three pixel sub-components, which usually have the colors red, green, and blue. Each pixel sub-component of the pixels of an LCD device is a discrete light emitting device that can be individually controlled using analog or digital processes, depending on the nature of the LCD device. LCD devices have become widely used in portable or laptop computers due to their size, weight, and relatively low power requirements. Over the years, however, LCD devices have begun to be more common in other computing environments, and have become more widely used with non-portable personal computers.

Conventional image data and image rendering processes were developed and optimized to display images on CRT display devices. The smallest unit on a CRT display device that is separately controllable is a pixel; the three dots included in each pixel are controlled together to generate the desired color. Conventional image processing techniques map samples of image data to entire pixels, with the three dots included in the pixel together representing a single portion of the image. In other words, each pixel of a CRT display device corresponds to or represents a single region of the image data.

The image data and image rendering processes used with LCD devices are those that have been originally developed in view of the CRT, three-dot pixel model. Thus conventional image rendering processes used with LCD devices do not take advantage of the separately controllable nature of pixel sub-components of LCD pixels, but instead generate together the luminous intensity values to be applied to the three pixel sub-components in order to yield the desired color. Using these conventional processes, each three-part pixel represents a single region of the image data.

It has been observed that the eyestrain and other reading difficulties that have been frequently experienced by computer users diminish as the resolution of display devices and the characters displayed thereon improve. The problem of poor resolution is particularly evident in flat pane) display devices, such as LCDs, which may have resolutions 72 or 96 dots (i.e., pixels) per inch (dpi), which is lower than most CRT display devices. Such display resolutions are far lower than the 600 dpi resolution supported by most printers. Even higher resolutions are found in most commercially printed text such as books and magazines. The relatively few pixels in LCD devices are not enough to draw smooth character shapes, especially at common text sizes of 10, 12, and 14 point type. At such common text rendering sizes, portions of the text appear more prominent and coarse on the display device than when displayed on CRT display devices or printed.

In view of the foregoing problems experienced in the art, there is a need for techniques of improving the resolution of images displayed on LCD display devices. Because any such improved rendering process would be likely to be used to display electronic documents that were originally created with legacy rendering processes, it would be important to maintain the formatting and overall document size when such existing electronic documents are displayed.

SUMMARY OF THE INVENTION

The present invention relates to image data processing and image rendering techniques whereby images are displayed on display devices having pixels with separately controllable pixel sub-components. Spatially different sets of one or more samples of image data are mapped to individual pixel sub-components rather than to full pixels. The resulting displayed image has at least some features that are rendered with sub-pixel precision. According to the invention, the advance width of text characters as displayed using the sub-pixel precision rendering processes are selected to be compatible with the advance width of the characters if they were to be instead rendered with a conventional full pixel precision rendering process. In other words, the characters are displayed according to the invention with sub-pixel precision, while the advance width and the corresponding size and spacing of the characters and the overall formatting of the document remains the same compared to documents and characters rendered using conventional full pixel precision processes.

The invention is particularly suited for use with LCD display devices or other display devices having pixels with a plurality of pixel sub-components of different colors. For example, the LCD display device may have pixels with red, green, and blue pixel sub-components arranged on the display device to form either vertical or horizontal stripes of same-colored pixel sub-components.

According to one implementation of the invention, image data representing one or more text characters is processed using a scaling operation, a hinting operation, and a scan conversion operation. After the image data is scaled in the scaling operation, selected points of the scaled image data are adjusted to a grid corresponding to the pixels of the displays device in the hinting operation. As part of the hinting operation, the left and right side bearing points of the character are repositioned to locations on the grid that correspond to full pixel boundaries in a way such that the resulting advance width is compatible with, or equal to, the advance width that would be generated using a full pixel precision rendering process.

During the hinting operation, the left edges of the stems of the character are adjusted to full pixel boundaries. Other points of the image data are either directly positioned or adjusted on the grid, or are interpolated based on previously positioned points. The hinting process involves identifying the selected points of the character that are to be repositioned with respect to the grid. Accordingly, the topology of the character is analyzed during runtime to identify these selected points. Because a direct and full analysis of character topology can consume significant processing time and resources, an indirect or partial topological analysis can be performed.

The hinted image data with the compatible advance widths is then processed according to the scan conversion process. In order to display the character with sub-pixel precision, spatially different sets of one or more samples of the image data are mapped to individual pixel sub-components of the pixels, rather than to entire pixels.

The invention can be used in a variety of computing and software environments to yield displayed characters and other images having improved resolution. For instance, the preservation of compatible advance widths can have significant benefits when used with electronic documents that are originally generated or are later displayed in connection with conventional full pixel precision rendering processes. Because the rendering processes of the invention result in compatible advance widths, documents generated or displayed according to the invention typically have the same general formatting if they are also displayed or generated using conventional rendering processes. Thus, the invention provides desirable interoperability between the sub-pixel precision rendering processes disclosed herein and conventional rendering processes.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 12 illustrates a portion of the hinted image data of FIG. 10 being subjected to the scan conversion operation of FIG. 7.

DETAILED DESCRIPTION OF THE INVENTION

Figure 1A:
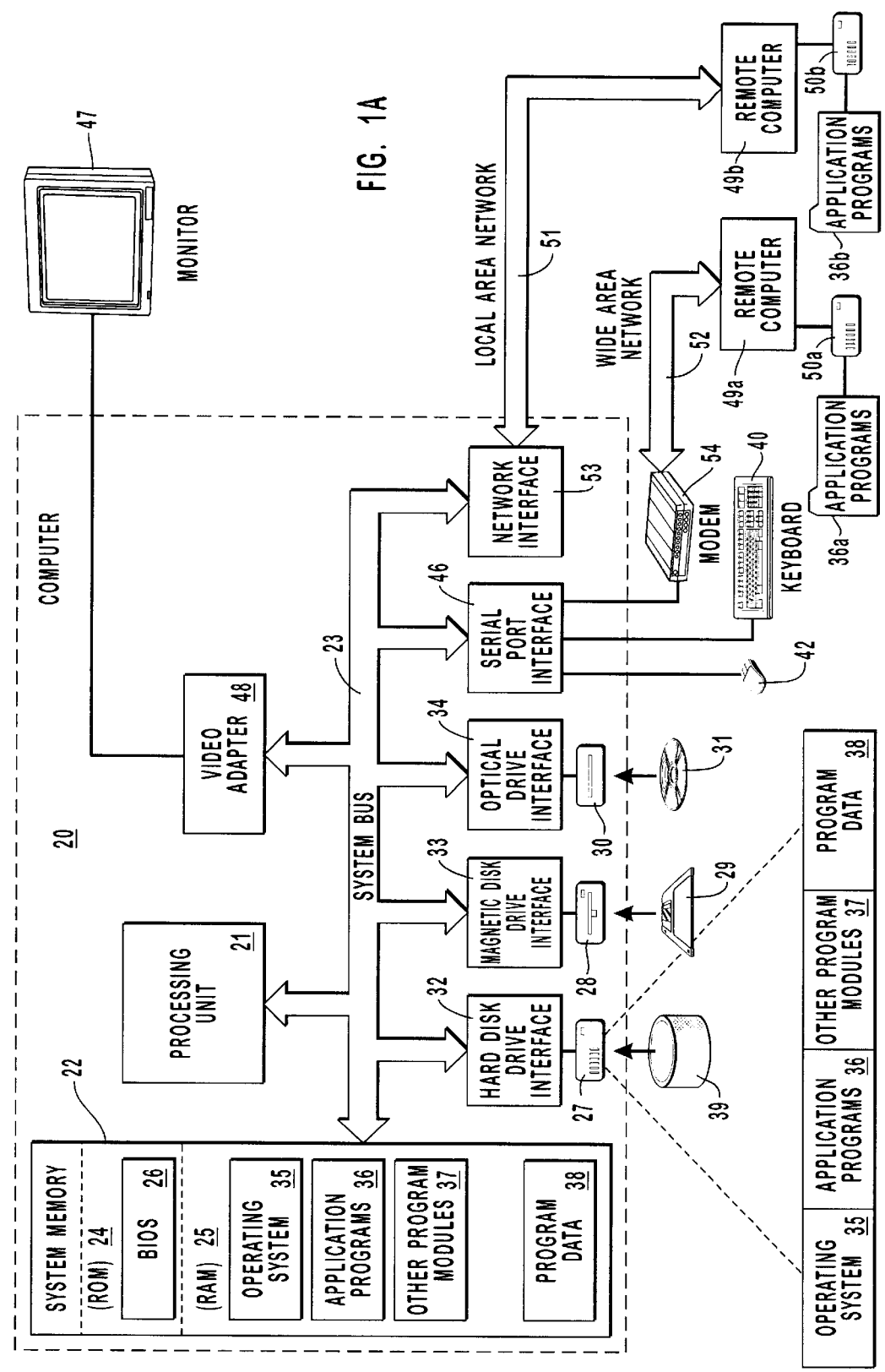
FIG. 1A illustrates an exemplary system that provides a suitable operating environment for the present invention.

The present invention relates to image data processing and image rendering techniques whereby selected portions of characters can be displayed on a display device with sub-pixel precision, while the advance width of the characters can be made equal to the advance width of the characters that would be generated using full pixel precision rendering techniques. The basic image rendering process includes a hinting operation, and a scan conversion operation. These operations together result in spatially different sets of one or more samples of selected portions of the image data being mapped to individual pixel sub-components of the pixels of a flat panel display device. Accordingly, at least a portion of the image is rendered on the display device with pixel sub-component precision, and each pixel sub-component of at least some of the pixels represents a different region of the image.

The invention is described herein primarily in the context of rendering text characters, although the invention and the general principles disclosed herein extend to processes of rendering other images. The image rendering processes are adapted for use with LCD devices or other display devices that have pixels with multiple separately controllable pixel sub-components. Although the invention is described herein primarily in reference to LCD devices, the invention can also be practiced with other display devices having pixels with multiple separately controllable pixel sub-components.

When, for example, a character having a stem is displayed according to one embodiment of the invention, the advance width is selected to have a value that is an integer multiple of the width of the pixels of the TCD device. In this manner, the character that is displayed on the display device has an advance width that is the same as the advance width that would have been generated had the character been displayed using a conventional rendering process that uses only full pixel precision. The stem, however, is processed and rendered so as to have width that has pixel sub-component precision, thereby improving the resolution of the character compared to conventional image rendering techniques.

Exemplary Computing Environments

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information I transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1A and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1A, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to he processing unit 21 through a serial port interface 46 coupled to system bus 23. Alternatively, the input devices may be connected by other interfaces, such as a parallel port, a game port or a universal serial bus (USB). An LCD device 47 is also connected to system bus 23 via an interface, such as video adapter 48. In addition to the LCD device, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1A. The logical connections depicted in FIG. 1A include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 1B:
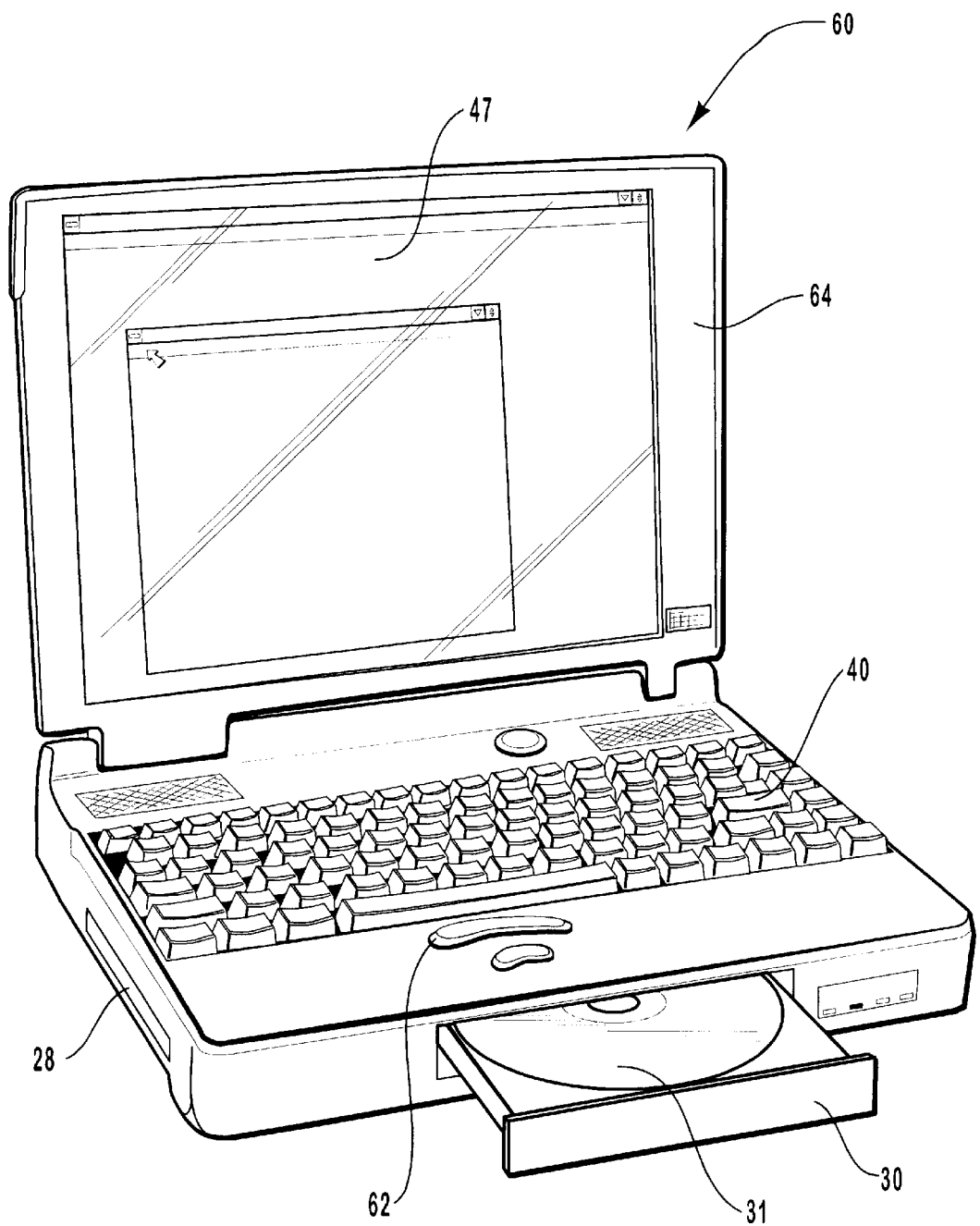
FIG. 1B illustrates a portable computer having an LCD display on which characters can be displayed according to the invention.

As explained above, the present invention may be practiced in computing environments that include many types of computer system configurations, such as personal computers, hand-held devices, multi-processor systems, microprocessor-based or programmable consumer electronics, network PCs, minicomputers, mainframe computers, and the like. One such exemplary computer system configuration Is illustrated in FIG. 1B as portable computer 60, which includes magnetic disk drive 28, optical disk drive 30 and corresponding removable optical disk 31, keyboard 40, monitor 47, pointing device 62 and housing 64. Computer 60 may have many of the same components as those depicted in FIG. 1B.

Portable personal computers, such as portable computer 60, tend to use flat panel display devices for displaying image data, as illustrated in FIG. 1B by monitor 47. One example of a flat panel display device is a liquid crystal display (LCD). Flat panel display devices tend to be small and lightweight as compared to other display devices, such as cathode ray tube (CRT) displays. In addition, flat panel display devices tend to consume less power than comparable sized CRT displays making them better suited for battery powered applications. Thus, flat panel display devices are becoming ever more popular. As their quality continues to increase and their cost continues to decrease, flat panel displays are also beginning to replace CRT displays in desktop applications.

Figure 2A:
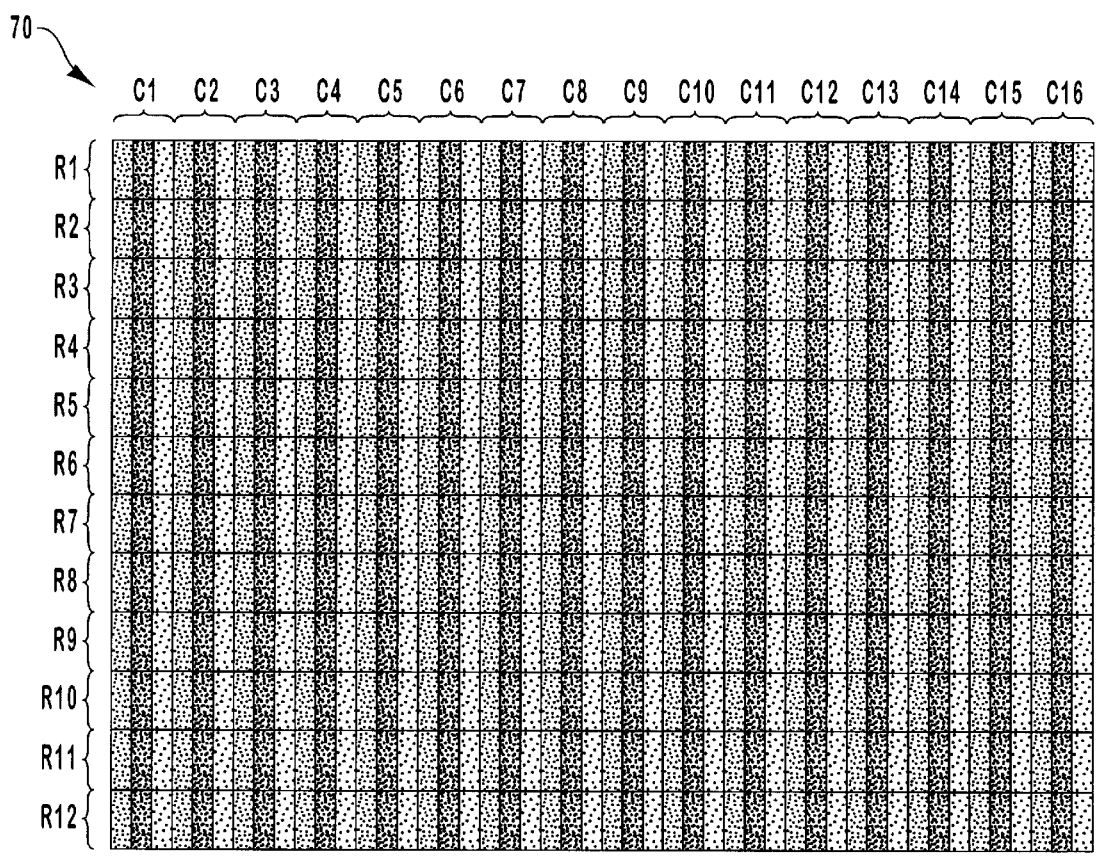
FIGS. 2A and 2B depict a portion of an LCD display and show the separately controllable pixel sub-components of the pixels of the LCD display.
Figure 2B:
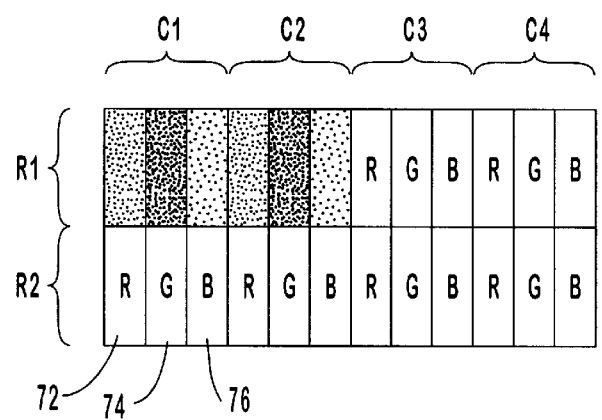

FIGS. 2A and 2B illustrate physical characteristics of an exemplary LCD display device. The portion of LCD 70 depicted in FIG. 2A includes a plurality of rows R1–R12 and a plurality of columns C1–C16. Color LCDs utilize multiple distinctly addressable elements and sub-elements, herein referred to as pixels and pixel sub-components, respectively. FIG. 2B, which illustrates in greater detail the upper left hand portion of LCD 70, demonstrates the relationship between the pixels and pixel sub-components.

Each pixel includes three pixel sub-components, illustrated, respectively, as red (R) sub-component 72, green (G) sub-component 74 and blue (B) sub-component 76. The pixel sub-components are non-square and are arranged on LCD 70 to form vertical stripes of same-colored pixel sub-components. The RGB stripes normally run the entire width or height of the display in one direction. Common LCD display devices currently used with most portable computers are wider than they are tall, and tend to have RGB stripes running in the vertical direction, as illustrated by LCD 70. Examples of such devices that are wider than they are tall have column-to-row ratios such as 640×480, 800× 600, or 1024×768. LCD display devices are also manufactured with pixel sub-components arranged in other patterns, including horizontal stripes of same-colored pixel sub-components, zigzag patterns or delta patterns. Moreover, some LCD display devices have pixels with a plurality of pixel sub-components other than three pixel sub-components. The present invention can be used with any such LCD display device or flat panel display device so long as the pixels of the display device have separately controllable pixel sub-components.

A set of RGB pixel sub-components constitutes a pixel. Thus, as used herein, the term "pixel sub-component" refers to one of the plurality of separately controllable elements that are included in a pixel. Referring to FIG. 2B, the set of pixel sub-components 72, 74, and 76 forms a single pixel. In other words, the intersection of a row and column, such as the intersection of row R2 and column C1, represents one pixel, namely (R2, C1). Moreover, each pixel sub-component 72, 74 and 76 is one-third, or approximately one-third the width of a pixel while being equal, or approximately equal, in height to the height of a pixel. Thus, the three pixel sub-components 72, 74 and 76 combine to form a single substantially square pixel. This pixel/sub-component relationship can be utilized for rendering text images on a display device, as will be further explained below.

Image Data Processing and Image Rendering Operations

The image rendering processes of the invention result in at least a portion of the image being displayed with pixel sub-component precision as opposed to full pixel precision. As used herein, the terms "pixel sub-component precision" and "sub-pixel precision" are interchangeable and refer to a feature of an image being displayed in a process whereby individual pixel sub-components represent different regions of an image rather than the entire pixel representing a single region of the image. An image rendering process having pixel sub-component precision can result in edges of a character being positioned at boundaries between pixel sub-components, regardless of whether the pixel sub-component boundaries are also boundaries between full pixels. Moreover, an image rendering process having pixel sub-component precision generates luminous intensity values of pixel sub-components independently of the luminous intensity values associated with other pixel sub-components in the same pixel. In other words, a luminous intensity value obtained in image rendering processes having pixel sub-component precision is not generated to create a specific color of the full pixel, but is instead generated based on one or more samples of the image data mapped to the particular pixel sub-component.

An image rendering process that has "full pixel precision", when applied to LCD display devices, results in entire pixels representing single regions of an image rather than the sub-components representing different regions of the image. In full pixel precision processes, edges of characters are positioned at boundaries between full pixels rather than at boundaries between pixel sub-components.

Examples of image rendering processes using full pixel precision include conventional processes originally developed for CRT display devices, which do not take advantage of the separately controllable nature of pixel sub-components of LCD display devices when applied to LCD display devices.

Figure 4:
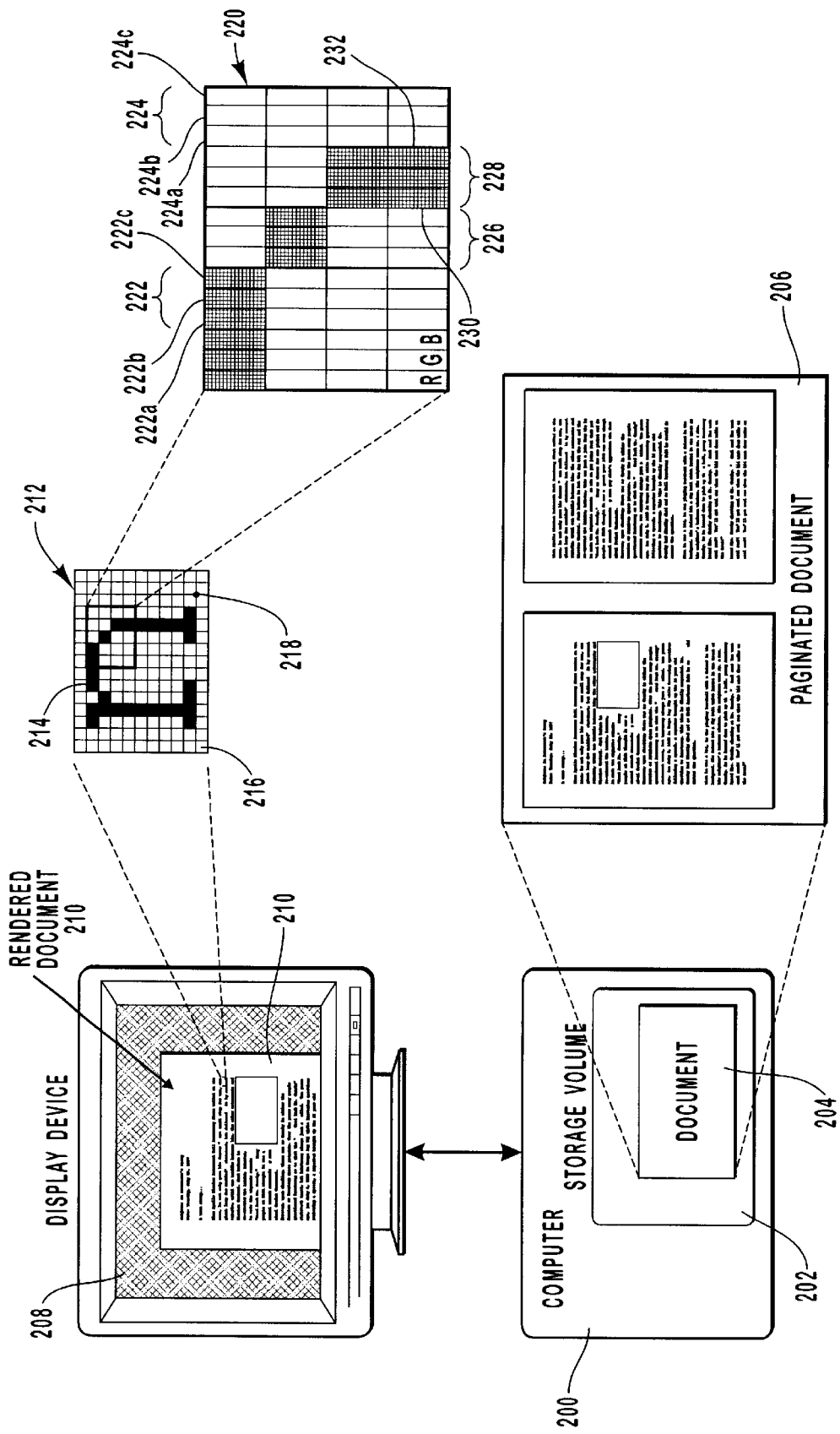
FIG. 4 depicts a document having been generated in association with a full pixel precision rendering process.

FIG. 4 illustrates a text character 114 as stored electronically and displayed on a display device. The electronically stored character is shown generally at 156, while the displayed character is shown generally at 158. The term "advance width" refers to the width, either actual or displayed, of a character. The advance width typically extends between a left side bearing point 116 aid a right side bearing point 118 that define the left and right extent of the region of the display device that is associated with the character. Assuming that character 114 has a black foreground, or black character body 140, and a white background 142, the advance width 144 generally includes a portion associated with the width 146 of the black character body and portions associated with the left bearing 148 and the right bearing 150. The left bearing 148 is the distance between the left side bearing point 116 and the left edge 152 of the black character body 140, while the right bearing 150 is the distance between the right edge 154 of the black character body 140 and the right side bearing point 118.

Figure 3:
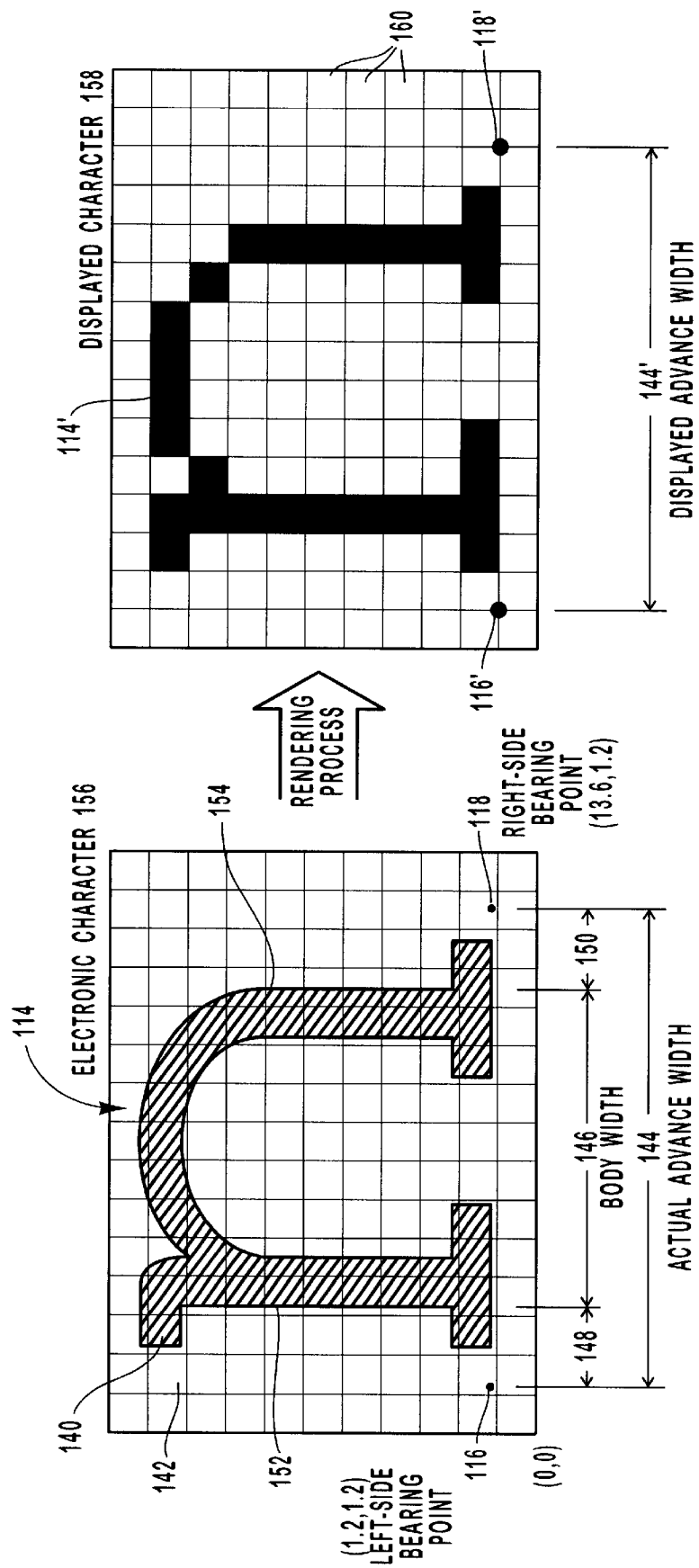
FIG. 3 illustrates a text character as stored electronically and displayed on a display device to present the concepts of advance width and other characteristics of the character.

The "actual advance width" of a character is the advance width that would be displayed if the character could be displayed with perfect precision and corresponds to the advance width of the character as stored electronically. The actual advance width is defined by left side bearing point 116 and right side bearing point 118 as they are stored in a memory or storage device as shown in FIG. 3 at 156. Regardless of the precision of the rendering process, bearing points 116 and 118 may be stored with any desired degree of precision, with a fractional component with respect to the width of the full pixels. For instance, left side bearing point 116 has a coordinate position of (1.2, 1.2) and right side bearing point 118 has a coordinate position (of 13.6, 1.2) when character 114 is stored electronically at 156 with a specified font size. Accordingly, character 114 has an actual advance width of 12.4 pixels.

The "displayed advance width" of the character is the advance width of the displayed character 114' shown generally at 158. Generating a displayed advance width 144' may involve adjusting the actual advance width 144 by, for example, repositioning the left side bearing point 116 to a full pixel boundary, and rounding the actual advance width to an integer multiple of the width of pixels 160. In FIG. 4, the repositioned left side and right side bearing points are illustrated at 116' and 118', respectively. In this example, using conventional full pixel precision rendering processes, the actual advance width 144 of 12.4 pixels becomes a displayed advance width 144' of 12.0 pixels. As used herein, the term "coarse advance width" is a displayed advance width 144' that is generated using a full pixel precision rendering process and has a value that is an integer multiple of the width of the pixels 160.

The term "compatible advance width" shall refer to a displayed advance width that is (i) generated using an image rendering process in which at least one of the features of the character is displayed with sub-pixel precision and (ii) has a value that is equal to the displayed advance width of the character if the character were to be displayed using a rendering process having only full pixel precision. Generating "compatible advance widths" results in documents having the same length when the document is displayed using the sub-pixel and full pixel precision rendering processes.

Figure 5:
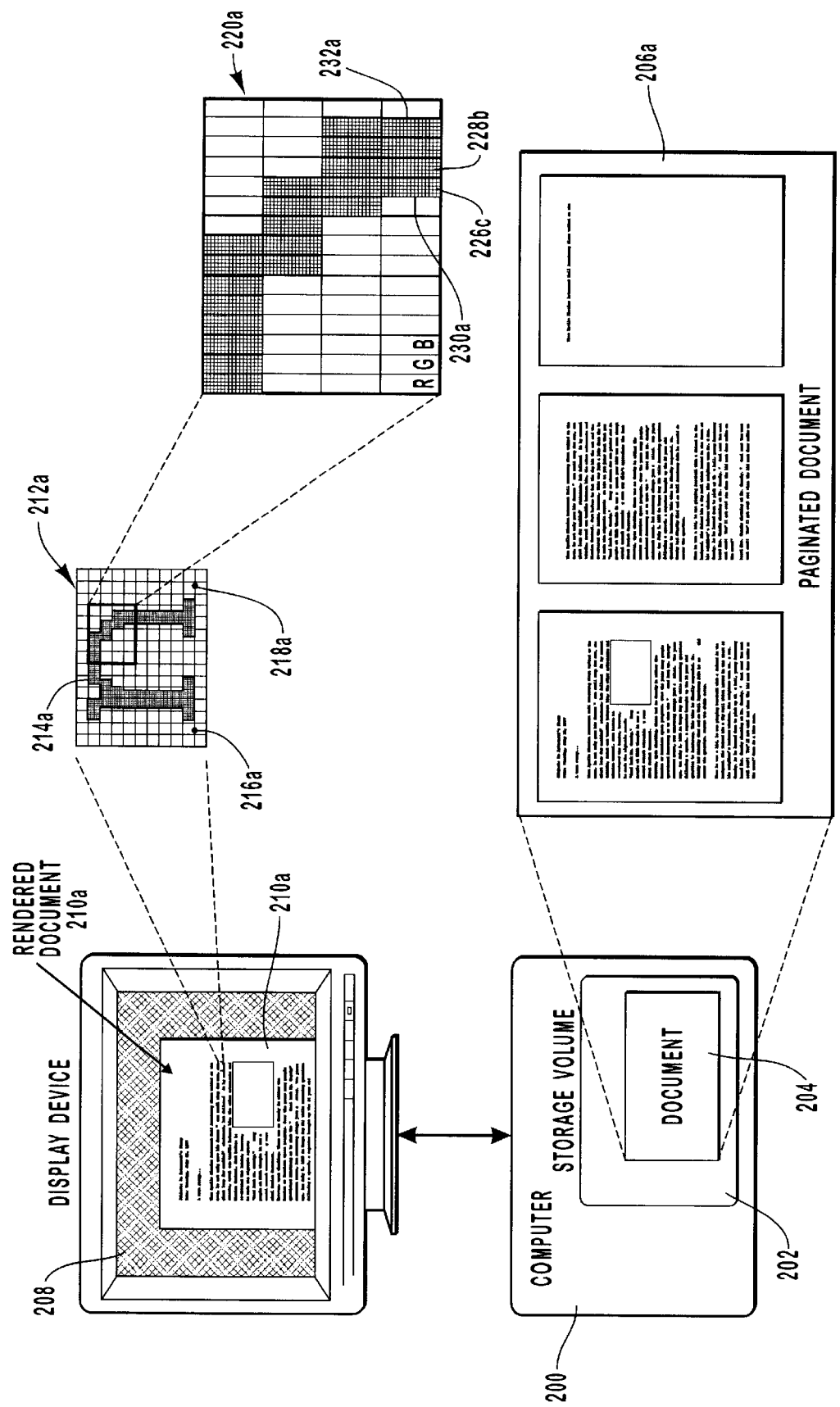
FIG. 5 illustrates the document of FIG. 4 having been displayed on a display device using a sub-pixel precision rendering process of the invention, but without the compatible advance widths of the invention.
Figure 6:
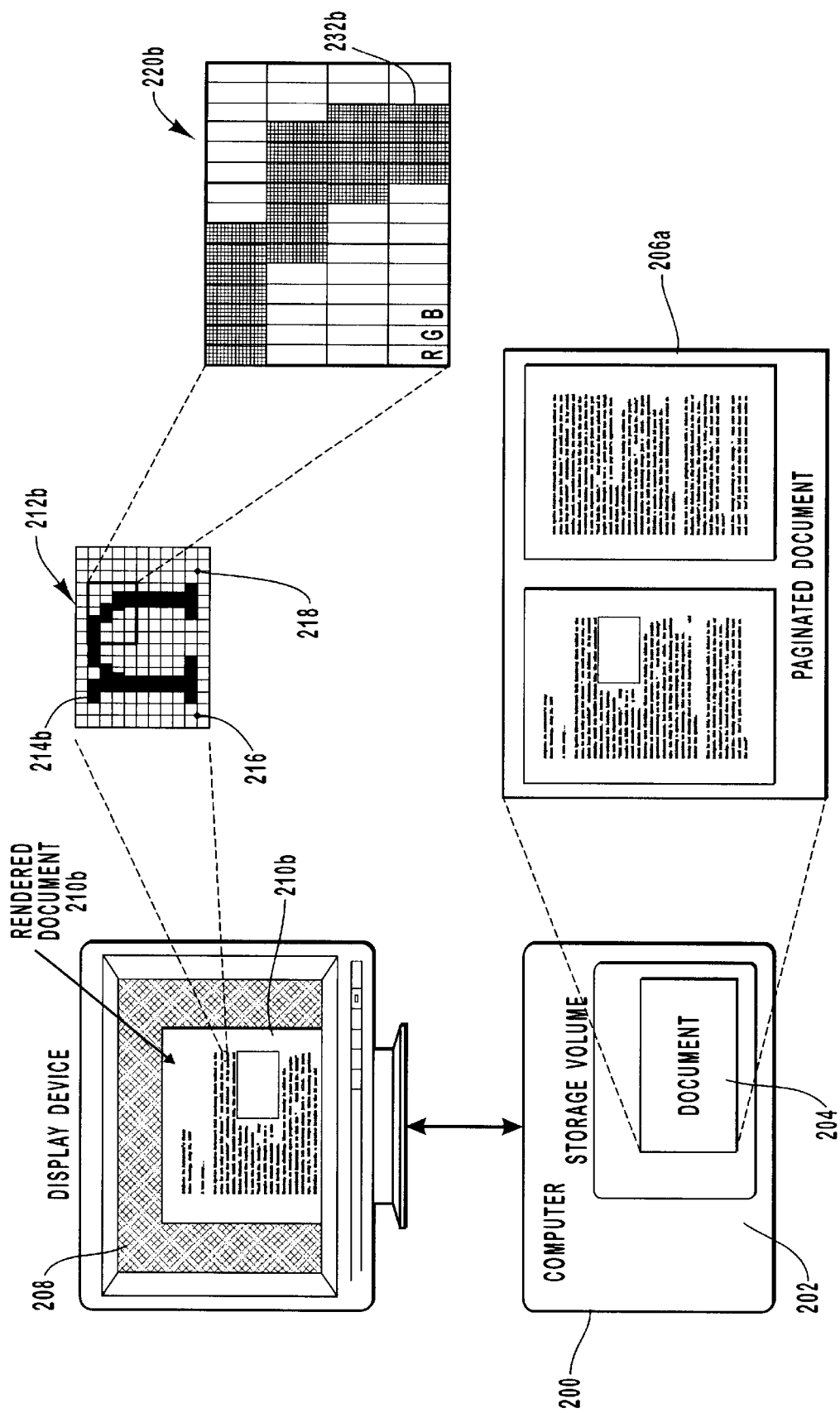
FIG. 6 illustrates the document of FIG. 4 having been displayed on the display device using a sub-pixel precision rendering process of the invention and resulting in compatible advance widths according to the invention.

FIGS. 4–6 depict a document being displayed on an LCD display device using image rendering processes having full pixel and pixel sub-component precision. FIG. 4 illustrates a computer 200 having a storage volume 202 in which an electronic document 204 is stored. FIG. 4 represents one example of image data that has been generated using legacy image rendering processes, and is presented in order to illustrate one of the various sources of image data that can be displayed using the image rendering processes of the invention. FIG. 5, which will be described in greater detail below shows document 204 of FIG. 4 being displayed using an image rendering process that has pixel sub-component precision. Although the image rendering process of FIG. 4 utilizes the pixel sub-component precision of the invention, it does not generate compatible advance widths. Thus, the process of FIG. 4 results in the potential loss of the original formatting of document 204.

In contrast to the image rendering process of FIG. 5, the process of FIG. 6 exhibits both the pixel sub-component precision of the invention and the compatible advance widths of the invention. Accordingly, the formatting, particularly the length, of a document generated using the conventional rendering process of FIG. 4 will remain the same regardless of whether the document is displayed as shown in FIG. 4 or in FIG. 6. Similarly, a document generated using the inventive rendering process of FIG. 6 will have the same formatting regardless of whether the document is displayed as shown in FIG. 6 or FIG. 4.

Referring now to FIG. 4, computer 200 can be any general purpose or special purpose computer in which image rendering processes can be performed. Examples of a suitable computer 200 include, but are not limited to, computer 20 of FIG. 1A and computer 60 of FIG. 1B. The components of computer 200 can be similar to those illustrated in FIGS. 1A and 1B. For instance, storage volume 202 can be the magnetic hard disk 39, the magnetic disk 29, or the optical disk 31 of FIG. 1A or any other storage device. Moreover, storage volume 202 can correspond to any memory device, such as ROM 24 or RAM 25 that is capable of storing an electronic document.

Electronic document 204 is any electronic document having characters or another image to be displayed on a display device. In this example, document 204 has been created with the assistance of a full pixel precision image rendering process, as will be discussed in greater detail hereinbelow. Document 204 has been formatted by a user to have a paginated representation 206 with a length of two pages. In other words, when document 204 is displayed on display device 208 using the full pixel precision process, the document has a length of two pages.

FIG. 4 illustrates document 204 being displayed on display device 208 as rendered document 210 using a conventional, full pixel precision rendering process. In this example, it will be assumed that display device 208 is an LCD display device, although it can also be a CRT display device. FIG. 4 illustrates a region 212 of display device 208 in greater detail to show the manner in which character "n" 214 is displayed with full pixel precision. Character 214 has a left side bearing point 216 and a right side bearing point 218 that have been mapped to full pixel boundaries, since FIG. 4 represents a full pixel precision rendering process. Although left side bearing point 216 and right side bearing point 218 are not actually rendered on display device 108 as a visible point, they are illustrated in FIG. 4 for purposes of describing the mechanics of displaying character 212 on display device 208.

Left side bearing point 216 and right side bearing point 218, which may be stored in electronic document 204 with fractional positional values, have been repositioned, or rounded, to the boundaries of full pixels, as will become evident in reference to FIGS. 4 and 5 below. The positioning of left side bearing point 216 and right side bearing point 218 on the full pixel boundaries results in character 214 having a displayed advance width having a value equal to the width of 12 full pixels. Because the rendering process of FIG. 4 has full pixel precision, the displayed advance width is a "coarse" advance width. The cumulative effect of the repositioning of the bearing points of the individual characters to full pixel boundaries in document 204 yields the overall formatting and length of the document, which is depicted generally at paginated document 206.

FIG. 4 also shows sub-region 220 of display device 208 to illustrate the full pixel precision of character 214 in greater detail. Sub-region 220 illustrates the red, green, and blue pixel sub-components of the pixels of display device 208. Because FIG. 4 represents a full pixel precision rendering process, each pixel corresponds to a single portion of the displayed character. For example, pixel 222, consisting of red pixel sub-component 222a, green pixel sub-component 222b, and blue pixel sub-component 222c, represents a single portion of the image inside the outline of character 214. Accordingly, pixel sub-components 222a–c have been controlled together (i.e., completely turned off) to represent a single region of character 214. Similarly, pixel 224, consisting of red pixel sub-component 224a, green pixel sub-component 224b, and blue pixel sub-component 224c, represents a single portion of the image outside the outline of character 214. Thus, pixel sub-components 224a–c have been controlled together (i.e., completely turned on) to represent a single region of the image.

Because the rendering process of FIG. 4 has full pixel precision, all features of character 214 have widths and heights that are integer multiples of the widths and heights of the pixels and have edges that fall on full pixel boundaries. For example, stem 232 of character 214 has a width that is equal to the width of one pixel and has a left edge 230 that falls on the full pixel boundary between pixel 226 and 228.

If display device 208 were instead a CRT display device, the individual pixels would consist of triads of phosphor dots rather than pixel sub-components, but the general principles described above in reference to FIG. 4 would apply. Specifically, the displayed advance widths would have values that are integer multiples of the width of the pixels and each pixel would represent a single portion of the image.

Over the years, most electronic documents have been created and formatted in association with full pixel precision rendering processes, such as that illustrated in FIG. 4. Although the invention can be used to render documents and images other than those originally generated using conventional full pixel precision techniques, many of the benefits and advantages of the invention will be described below in reference to FIG. 6, which show the manner in which compatible advance widths can be maintained while using a sub-pixel precision rendering process to display electronic document 204 of FIG. 4.

Prior to describing FIG. 6, attention is directed to FIG. 5, which depicts electronic document 204 being displayed using the sub-pixel precision rendering processes of the invention without generating the compatible advance widths of the invention. The sub-pixel precision rendering process of FIG. 5 can generate high-resolution characters that are significantly more readable than the characters of conventional rendering processes, although it can result in incompatible advance widths and differences in document formatting compared to conventional techniques.

The display device 208 of FIG. 5 is an LCD display device or other display device having separately controllable pixel subcomponents. Rendered document 210a has characters with at least some features being displayed with the sub-pixel precision. While FIG. 5 illustrates the results of rendering characters with sub-pixel precision, the details of the image rendering processes of the invention are described in greater detail in reference to FIGS. 7–12 below Region 212a and sub-region 220a of display device 208 of FIG. 5 illustrate in greater detail the results of displaying character 214a with sub-pixel precision. For example, stems or other features of character 214a can have widths that are not integer multiples of the widths of full pixels. Stem 232a has a width equal to the width of four pixel sub-components or four-thirds of the width of a full pixel. Moreover, edges of character 214a can fall on any pixel sub-component boundary, regardless of whether the boundary is also a boundary between full pixels. For instance, left edge 230a of character of 214a falls on a boundary between a red pixel sub-component 228a and a green pixel sub-component 228b, which is not a boundary between full pixels. The sub-pixel precision rendering process of FIG. 5 involve each pixel sub-component representing a different portion of the image data that defines character 214a, rather than entire pixels representing single portions of the image data.

While the sub-pixel precision rendering processes of FIG. 5 enhance the readability and resolution of the displayed characters and documents, process of FIG. 5 does not preserve compatible advance widths of characters. In particular, character 214a has a left side bearing point 216a and a right side bearing point 218a that are positioned with sub-pixel precision. Accordingly, the displayed advance width, or the distance between bearing points 216a and 218a can have a value that is not an integer multiple of the widths of the full pixel and which may be different from the displayed advanced width of character 214 of FIG. 4. The cumulative affect of incompatible advance widths being generated in rendered document 201a can often have the effect of altering the formatting and length of the document. This is further illustrated at paginated document 206a, which, in this example, has a length that is greater than paginated document 206 of FIG. 4. The converse process can also lead to formatting problems, when, for example, a document is generated in association with the sub-pixel precision rendering process of FIG. 5 and is later displayed using a full pixel precision rendering process, such as that of FIG. 4.

FIG. 6 illustrates electronic document 204 having been displayed as rendered document 210b on display device 208 using a sub-pixel precision rendering process of the invention that results in the preservation of compatible advance widths of display characters. Character 214b is displayed with at least some features having sub-pixel precision as shown in region 212b and sub-region 220b of display device 208. For instance, stem 232b has a width equal to the width of four pixel sub-components or four-thirds of the width of an entire pixel.

In addition to producing the improved resolution and readability, the image rendering processes of FIG. 6 result in advance widths of characters that are compatible with, or equal to, the advance widths of the characters if they had instead been displayed using a full pixel precision rendering process. For example, character 214b has a left side bearing point 216 and a right side bearing point 218 that result in the displayed advance width being the same as the displayed advance width of character 214 of FIG. 4. Consequently, the overall size and spacing of the characters and the length of rendered document 210*b* are substantially the same as those generated using a full pixel precision rendering process of FIG. 4. As a result, paginated document 206 has the same formatting in FIGS. 4 and 6.

The preservation of compatible advance widths according to the invention can preserve the formatting of electronic document 204 when the document is first generated in association with the full pixel precision process of FIG. 4 and later displayed using the sub-pixel precision process of FIG. 6. Similarly, formatting of electronic document 204 can be preserved when the electronic document is first generated in association with the sub-pixel precision process of FIG. 6 and later displayed using the full pixel precision process of FIG. 4. Although FIGS. 4 and 6 illustrate one benefit of the invention, the invention is not limited to situations where documents are successively displayed in full pixel precision and sub-pixel precision rendering processes, unless otherwise specifically indicated in individual claims. For instance, the invention extends to the electronic document generated in association with the image rendering processes of FIG. 6, regardless of whether the electronic document is displayed at another time using full pixel precision process.

Figure 7:
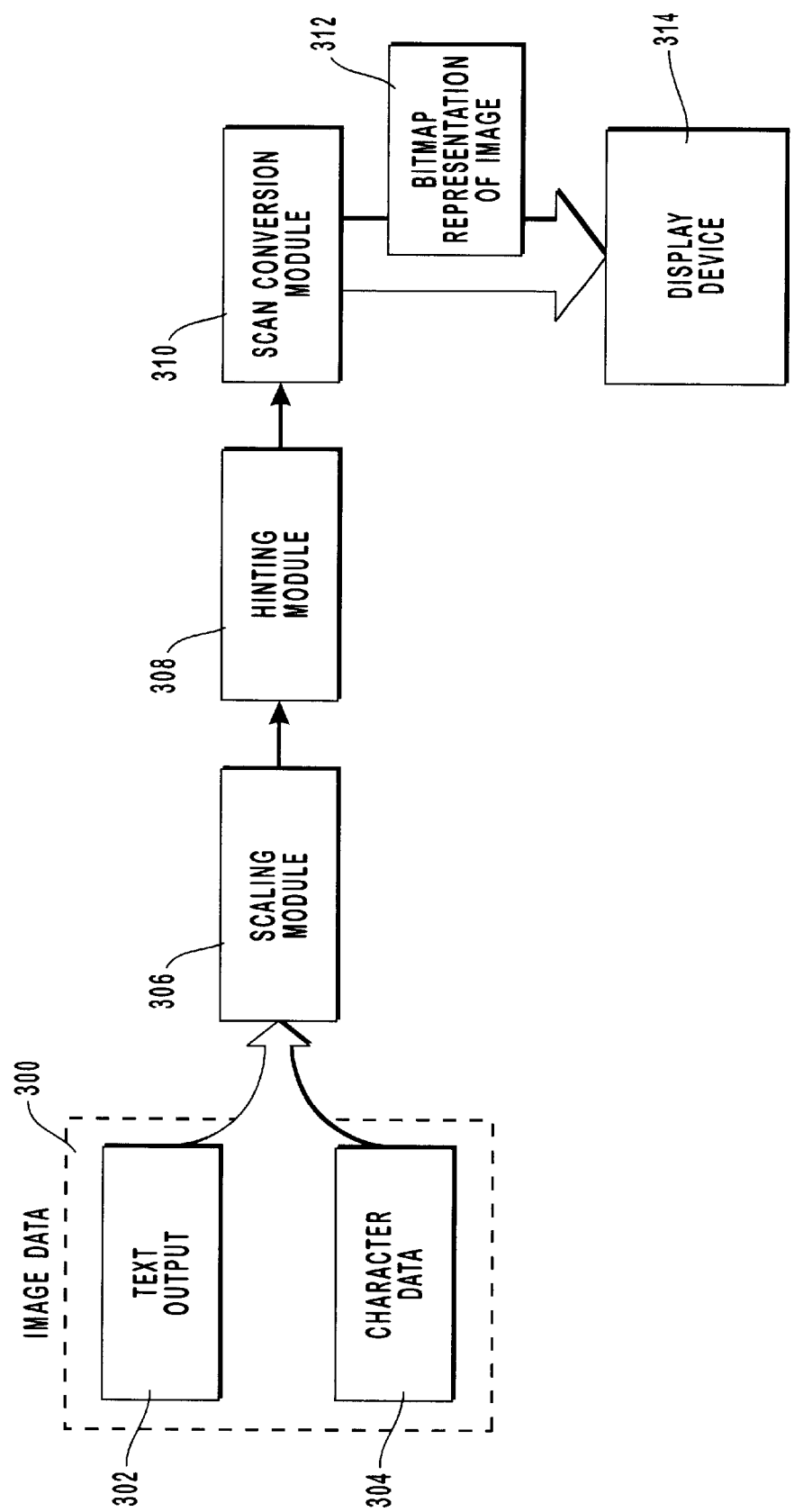
FIG. 7 is a high level block diagram illustrating selected functional modules whereby a sub-pixel precision rendering process can be performed according to one embodiment of the invention.

Details of the image rendering processes of FIG. 6 are further described herein below in reference to FIGS. 7–12. FIG. 7 is a high level block diagram representing selected functional modules of a system that is capable of forming the image processing of the invention. Image data 300 define the image, such as an electronic document, that is to be displayed. Image data 300 includes text output 302 and character data 304. Text output 302 can include, for example, the identification of the text character to be displayed. Text output 302 may be generated by a word processing application or any other desired computer process. Character data 304, in contrast, include geometric, tabular, or mathematical definitions or other definitions of the characters that are to be used to construct and display the image represented by image data 300. In other words, character data 304 represents the instructions used by the computer to render specific characters, while text output 302 indicates which of the characters are to be included in the image.

Image data 300 is received successively by scaling module 306, hinting module 308, and scan conversion module 310 to generate a bit map representation 312 of the image. Together, scaling module 306, hinting module 308, and scanning conversion module 310 result in spatially different sets of one or more samples of image data 300 being mapped to individual pixel sub-components of display device 314 rather than to entire pixels of display device 314.

Figure 8:
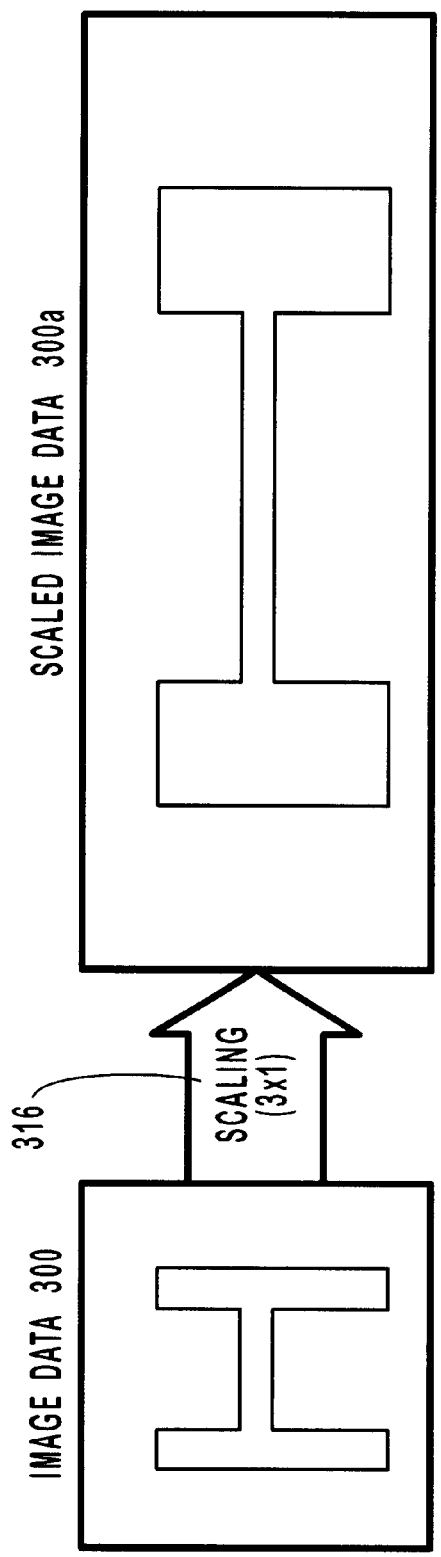
FIG. 8 illustrates a scaling operation by which image data is scaled as part of the sub-pixel precision rendering process of FIG. 7.

FIG. 8 illustrates one example of scaling operation performed by scaling module 306 of FIG. 7. In this example, image data 300 represents the letter "H." The image processing operation in FIG. 7 and in the subsequent figures assume that the display device has vertical stripes of same-colored pixel sub-components. The scaling operation 316 scales image data 300 by a factor of three in the direction perpendicular to the vertical striping of the display device and by a factor of one in the direction parallel to the vertical striping, resulting in scaled image data 300*a*.

The scaling by a factor of three is presented by way of example only, and not by limitation. Alternatively, the scaling factor can have other values, including a value of one or any other number. A more detailed description of scaling operations that can be used in conjunction with the rendering processes of the invention is included in U.S. patent application Ser. No. 09/546,422, entitled "Methods and Systems for Asymmetric Super-Sampling Rasterization", filed on the same day as this application and in U.S. Pat. No. 6,278,434, filed Oct. 7, 1998, entitled "Methods and Apparatus for Resolving Edges within a Display Pixel," both of which are incorporated herein by reference.

Figure 9:
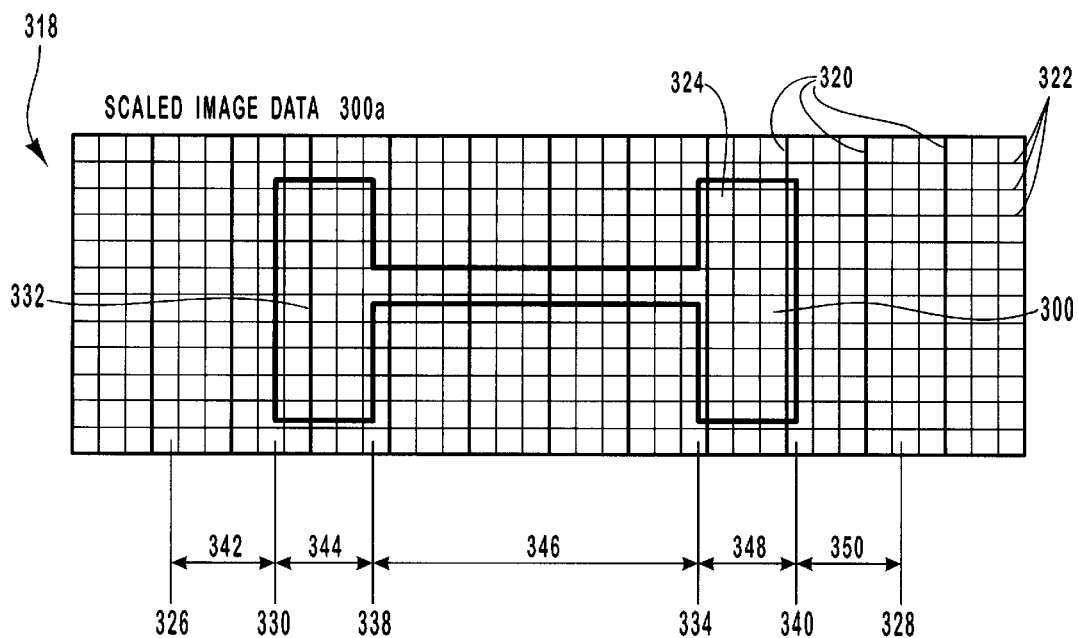
FIG. 9 illustrates the scaled image data of FIG. 8 having been superimposed over a grid corresponding to the pixels of a display device prior to the hinting operation of FIG. 7 being conducted.
Figure 10:
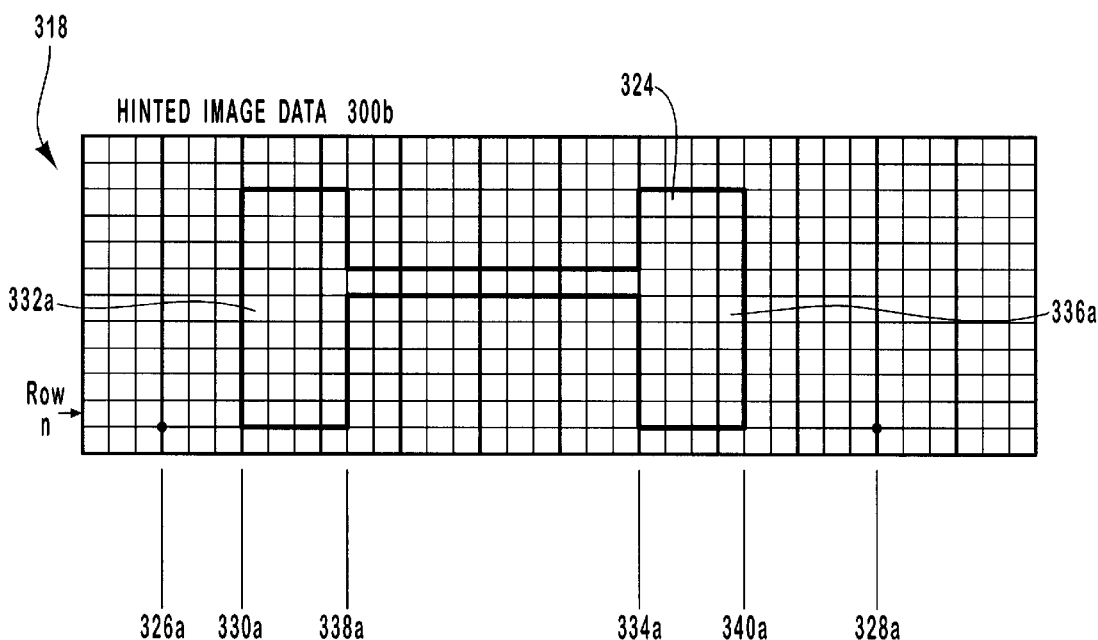
FIG. 10 depicts the scaled image data of FIG. 9 after the hinting operation has been conducted.

Scaled image data 300*a* is shown in FIG. 9 having been superimposed onto a grid 318 having vertical grid boundaries 320 and horizontal grid boundaries 322 that correspond to the boundaries between full pixels on the display device. Character 324 as stored electronically prior to the hinting operation can have a left side bearing point 326 and a right side bearing point 328 being positioned with respect to grid 318 at locations that do not correspond to full pixel boundaries. In FIG. 10, character 324 is fitted to grid 318 in the hinting operation performed by hinting module 308 of FIG. 7 to generate hinted image data 300*b*. The hinting operation preserves compatible advance widths and also results in certain features of character 324 being prepared to be displayed with sub-pixel precision as will be apparent hereinafter.

Figure 11A:
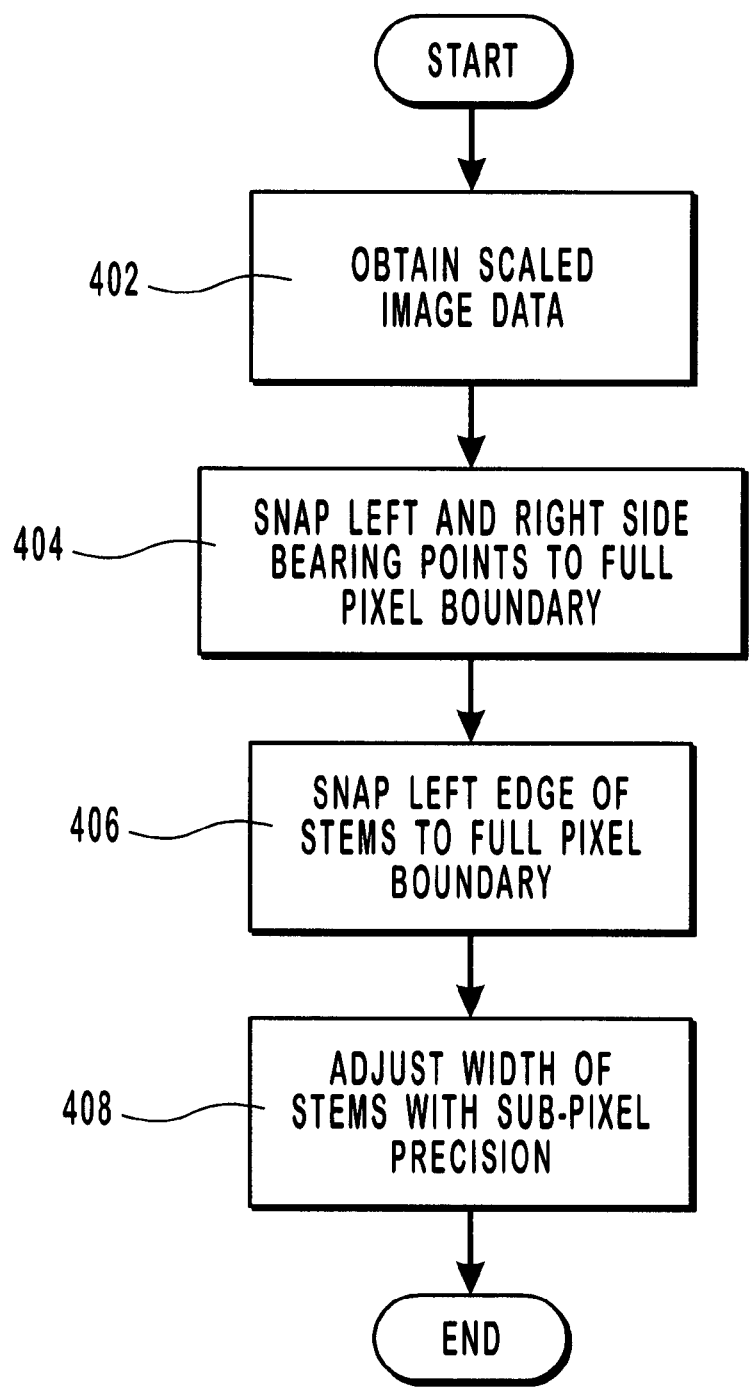
FIG. 11A is a high level flow diagram showing selected steps of one example of the hinting operations of the invention.

FIG. 11*a* is a high level flow diagram showing selected steps of the hinting operation conducted by hinting module 308 of FIG. 7. The steps of FIG. 11*a* can be conducted using any available techniques whereby the topology of the character can be analyzed at run time. One specific example of techniques for analyzing the topology of the character will then be described in reference to FIG. 11*b*.

Referring first to FIG. 11*a*, the process includes step 402, wherein the scaled image data is obtained. In step 404, the left and right side bearing points are snapped or repositioned to full pixel boundaries. Step 404 is further illustrated by referring to the example of FIGS. 9 and 10. In particular, left side bearing point 326 of FIG. 9 is rounded to a full pixel boundary as shown by hinted left side bearing point 326*a* of FIG. 10. Similarly, right side bearing point 328 of FIG. 9 is repositioned to a full pixel boundary as shown by hinted right side bearing point 328*a* of FIG. 10. It is noted that snapping the left and right side bearing points to full pixel boundaries in step 404 of FIG. 11*a* results in a compatible advance width of the hinted character that is an integer multiple of the width of the pixels.

In step 406, the left side of any stems of the character are snapped to full pixel boundaries. Step 406 can likewise be further illustrated by referring to the examples of FIGS. 9 and 10. In, particular, left edge 330 of stem 332 is adjusted to a full pixel boundary as shown by left edge 330*a* of FIG. 10. Similarly, left edge 334 of stem 336 is adjusted to a full pixel boundary as shown by left edge 334*a* of FIG. 10. It is noted that snapping selected portions of the character to full pixel boundaries in steps 404 and 406 does not necessarily mean that selected features are adjusted, or rounded, to the nearest full pixel boundary. In general, these features are adjusted to full pixel boundaries in a manner that preserves the compatible advance width of the character and maintains the desired relative positioning of the various features of the character. As noted previously, one specific example of the technique for analyzing the topology of the character will be described in reference to FIG. 11*b*, which also include steps for determining to which full pixel boundaries the selected features of the character are to be repositioned.

Referring now to FIG. 11*a*, step 408 involves adjusting the width of any stems of the character with sub-pixel precision. Step 408 can be further understood by referring again to the example of FIGS. 9 and 10. Stems 332 and 336 of character 334 are adjusted with sub-pixel precision, resulting in the right edge 338 of stem 332 and the right edge 340 of stem 336 being repositioned. This is shown by hinted right edge 338*a* and hinted right edge 340*a* of FIG. 10. Consequently, stem 332*a* and stem 336*a* have a width in hinted image data 300*b* that corresponds to the width of four pixel sub-components. It has been found that accurately rendering the widths of character stems is often more important for generating high legible characters than accurately sizing white spaces between stems, particularly in characters that have multiple stems.

Figure 11B:
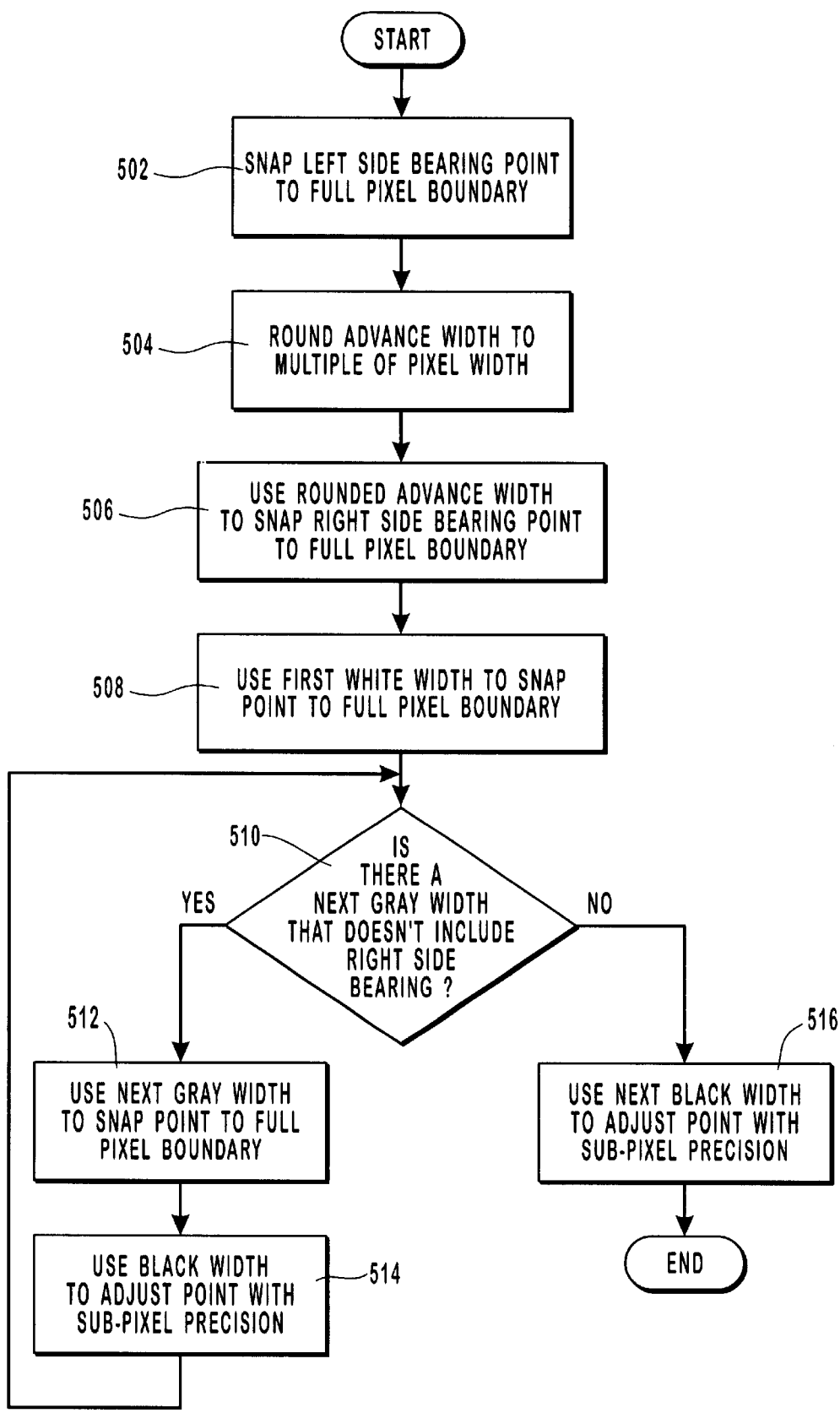
FIG. 11B is a flow diagram illustrating selected steps of one embodiment of the hinting operations of the invention.

FIG. 11*b* is a flow diagram showing the steps of one embodiment of the hinting operations of the invention that analyzes the topology of the text character by referring to data structures that identify specific dimension of the text character. For instance, some font definitions include a directed acyclic graph (DAG), or information that can be used to devise a DAG, that defines white widths, black widths, and gray widths.

As used herein, the term "white widths" or "white distances" refers to a portion of the advance width of a character that corresponds to the background color of the character. White widths are open positioned between stems or between a stem and a bearing point. Example of white widths include white widths 342, 346, and 350 at FIG. 9. The term "black widths" or "black distances" as used herein, refers to portions of the advance width of the character that correspond to the foreground color of the character. Black widths are often associated with the stems of characters that have stems. Example of black widths include black width 344 and 348 of FIG. 9. The term "gray widths" or "gray distances" as used herein, refers to a portion of the advance width of the character that includes at least one white width and at least one black width. For example, the advance width of a character is generally a gray width. Other examples of gray widths include the combination of widths 344 and 346 and the combination of widths 348 and 350 of FIG. 9. True Type fonts developed by Microsoft Corporation of Redmond, Washington, represent one example of text characters that can be defined in part by directed acyclic graphs and have white, black, and gray widths.

Referring now to FIG. 11*b*, step 502 involves snapping the left side bearing point to a full pixel boundary. This can involve snapping the left side bearing point of a character to the same full pixel boundary where the right side bearing joint of an immediately preceding character is located or rounding the left side bearing point to the nearest full pixel boundary. Step 502 is illustrated in FIG. 10 by left side bearing point 326*a* positioned at the full pixel boundary.

Step 504 involves rounding the advance width to an integer multiple of the pixel width. This can be performed by rounding the actual advance width of the character stored electronically to the nearest integer multiple of the width of the pixels. In step 506, the rounded advance width is used to snap the right side bearing point to a full pixel boundary. Step 506 is illustrated in FIG. 10 by right side bearing point 328*a* having been positioned to a full pixel boundary such that the advance width of character 324 has a value equal to the width of nine full pixels. Beginning with step 508 of FIG. 11*b*, file directed acyclic graph included in the font definition or font file is traversed.

Directed acyclic graphs in font files and examples of their traversal that can be applied to the present invention are disclosed in co-pending U.S. patent application Ser. No. 09/546,139, filed on the same date as the present application, and entitled "Automatic Optimization of the Position of Stems of Text Characters," which is incorporated herein by reference. The directed acyclic graph is one example of character data or a data structure that defines the position of selected points associated with a character and defines the relationship between the selected points in a parent/child hierarchy.

In step 508, the first white space defined in the DAG is used to snap a point to a full pixel boundary. Step 508 is further illustrated in examples of FIGS. 9 and 10. The first white space of step 508 is white space 342, while the point snapped to the full pixel boundary is positioned on left-edge 330 of stem 332. A white width 342 is rounded to the nearest integer multiple of the width of the pixels, thereby resulting in left edge 330 being adjusted to the position shown by left edge 330*a* of FIG. 10.

The method of FIG. 11*b* advances to decision block 510, where it is determined if there is a mixed gray width in the DAG that does not include the right side bearing. In the example of FIG. 9, decision block 510 is answered affirmatively because the next gray width defined by the DAG is the gray width represented by the combination of widths 344 and 346, which does not include right side bearing (i.e., right side bearing 350). Returning now to FIG. 11*b*, if decision block 510 is answered affirmatively, the method advances to step 512, in which the next gray width is used to snap a point to a full pixel boundary. In FIGS. 9 and 10, the point associated with step 512 is positioned at left edge 334 of stem 336, since that point is at the distant side of the next gray width (i.e., combination of widths 344 and 346). The point at edge 344 is snapped to a full pixel boundary as shown by edge 334*a* of FIG. 10.

In step 514 of FIG. 11*b*, the black width (i.e., the black width included in the next gray width of step 512) is used to adjust a point width sub-pixel precision. Referring to FIG. 9, the black width of step 514 in this example is black width 344 and the point to be adjusted is at right edge 338 of stem 332. Since that point is at the distant end of black width 344, the point at edge 338 is adjusted with sub-pixel precision to be located as shown at 338*a* of FIG. 10. Consequently, stem 332*a* has a width that can be a non-integer multiple of the width of the full pixels. In this example, stem 332*a* has a width equal to four pixel sub-components or four-thirds the width of a full pixel. In this manner, selected features (e.g., character stems) will be displayed with sub-pixel precision.

The method of FIG. 11*b* returns to decision block 510 after step 514. The next gray width of decision block 510 is measured from the end point of the previous gray width or the previous white width. In the example of FIG. 9, the next gray width is the gray width consisting of widths 348 and 350, which does include right side bearing (i.e., width 350). Referring to FIG. 11*b*, decision block 510 is answered in the negative and the method proceeds to step 516, in which the next black width is used to adjust a point with sub-pixel precision. In the example in FIG. 9, the next black width of step 516 is black width 348, while the point to be adjusted is at right edge 340 of stem 336. The point at right edge 340 is adjusted with sub-pixel precision as shown by right edge 340*a* of FIG. 10.

Any other features of the character can then be repositioned if needed with respect to the key points described above in reference to FIG. 11*b*. FIG. 12 illustrates a portion of a scan conversion operation conducted by scan conversion module 310 of FIG. 7. Row N of FIG. 12 corresponds to row N of grid 318 of FIG. 10. The scan conversion operation of FIG. 12 involves mapping spatially different sets of one or more samples of the hinted image data to pixel sub-components of the display device or to generate bit map representation 312 of the image.

In the example of FIG. 12, each of the spatially different sets of one or more samples includes exactly one sample. Alternatively, any number of samples can be mapped to the pixel sub-components. In general, spatially different sets of one or more samples are mapped to each pixel sub-component. The process of mapping sets of samples to pixel sub-components can be understood as a filtering process. The filters correspond to the position and number of samples included in the sets of samples mapped to the individual pixel sub-components. Filters corresponding to different colors of pixel sub-components can have the same size or different sizes. The samples included in the filters can be mutually exclusive (e.g., each samples is passed through only one filter) or the filters can overlap (e.g., some samples are included in more than one filter). In general, the filters used in the scan conversion process can be adapted to produce desirable color effects on the displayed images. Further information relating to scan conversion operations that can be used in conjunction with the invention are disclosed in U.S. patent application Ser. No. 09/168,014, filed Oct. 7, 1998, entitled "Methods and Apparatus for Performing Image Rendering and Rasterization Operations," which is incorporated herein by reference.

The samples 352 of row N are mapped to pixel sub-components of row N' in order to generate the luminous intensity values to be applied to the pixel sub-components for displaying the character. Samples 352a–c are mapped, respectively, to red, green, and blue pixel sub-components of row N'. Because samples 352a–c fall outside the outline 354 shown in FIG. 12, the red, green, and blue pixel sub-components to which they are mapped are given intensity values that correspond to the background color of the character. Samples 352d–g are mapped to red, green, blue, and red pixel sub-components. Because samples 352d–g fall within outline 354, the corresponding red, green, blue, and red pixel sub-components are given luminous intensity values that correspond to the foreground color of character 324. Similarly, samples 352h and 352i are mapped to green and blue pixel sub-components, which are given luminous intensity values corresponding to the background color of character 354.

In this manner, character 324 is prepared to be displayed on the display device with sub-pixel precision, at least with respect to the stems of the character. Each of the pixel sub-component represents a different region of the image data rather than entire pixel representing single portions of the image data.

Figure 13:
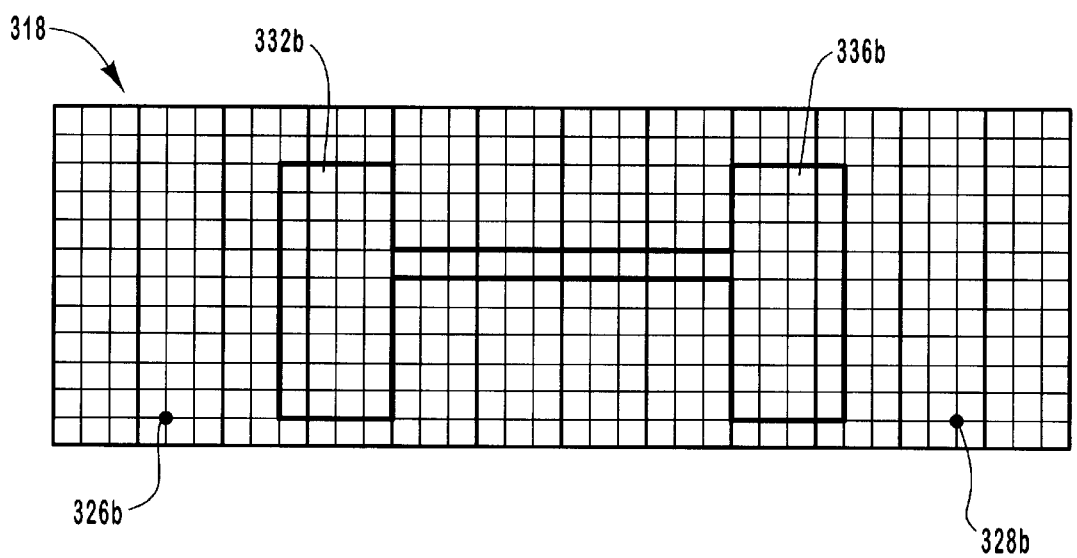
FIG. 13 illustrates the results of a hinting operation conducted on the image data of FIG. 8 that does not yield the compatible advance widths of the invention.

FIG. 13 is presented to contrast the hinted image data 300b of FIG. 10 that results both in sub-pixel precision for at least some features of the character and compatible advance widths with a hinting process that results in pixel sub-precision, while not preserving compatible advance widths. The hinting process of FIG. 13 results in stems 332b and 336b having a width that has a sub-pixel precision value. Moreover, left side bearing point 326b and right side bearing point 328b are positioned on grid 318 with sub-pixel precision. However, the displayed advance width, or the distance between left side bearing point 326b and right side bearing point 328b has a value that is a non-integer multiple of the width of the full pixels and is not a compatible advance width. The hinting process of FIG. 13 is one that is used, for instance, in the image rendering process of FIG. 5.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a processing device associated with a display device, wherein the display device has a plurality of pixels each having a plurality of pixel subcomponents and wherein each pixel sub-component within a particular pixel has a color that is different from the other pixel sub-components of the particular pixel, a method of displaying a character such that a selected feature of the character has a width rendered with pixel sub-component precision, while maintaining an advance width of the character having a value that is an integer multiple of the width of the pixels, the method comprising the steps of:

obtaining existing image data representing a character having a selected feature, the character having a coarse advance width that is associated with the character when the character is displayed using a full pixel precision rendering process in which the widths of character features of the character are integer multiples of the width of the pixels;

adjusting a width of the selected feature of the character to pixel sub-component precision; and based on the image data, displaying the character on the display device using a pixel sub-component precision rendering process wherein:

the selected feature is rendered with pixel sub-component precision, such that the said adjusted width of the selected feature is different from the width of the selected feature that would be displayed if the selected feature were to be displayed using the full pixel precision rendering process and is not an integer multiple of the width the pixels; and the displayed advance width of the character has a value that is an integer multiple of the width of the pixels and is equal to the coarse advance width, such that the displayed advance width of the character obtained using the pixel sub-component precision rendering process is the same as the coarse advance width that would be obtained if the character were to be rendered using the full pixel precision rendering process.

2. A method as recited in claim 1, wherein the step of obtaining image data comprises the act of accessing the image data from a document that has been created by a user in association with the full pixel precision rendering process.

3. A method as recited in claim 1, wherein the step of displaying the character further comprises the act of mapping spatially different sets of one or more samples of the image data to each of the plurality of pixel sub-components of a particular pixel.

4. A method as recited in claim 3, in at least two of the spatially different sets have at least one sample in common, such that said at least one sample is mapped to at least two of the plurality of pixel sub-components of the particular pixel.

5. A method as recited in claim 1, wherein the step of displaying the character comprises the steps of:

during runtime, analyzing the topology of the character to identify selected points of the character that are to be fitted to a grid defined by the pixels; and positioning the selected points to grid points of the grid such that the width of the selected feature of the character is rendered with pixel sub-component precision and the displayed advance width of the character obtained using the pixel sub-component precision rendering process is the same as the coarse advance width that would be obtained if the character were to be rendered using the full pixel precision rendering process and is an integer multiple of the width of the pixels.

6. A method as recited in claim 1, wherein the selected feature of the character comprises a stem of the character.

7. A method as recited in claim 6, further comprising the acts of:

retrieving the image data from a storage volume associated with the processing device, the image data identifying key points of the character and a parent/child hierarchy of the key points, the key points including a left side bearing point, a point on a left edge of the stem, and a point on a right edge of the stem;

using the parent/child hierarchy:

positioning the left side bearing point to a first grid point on a grid defined by the pixels, the first grid point corresponding to a boundary between pixels;

positioning the point on the left edge to a second grid point on the grid, the second grid point corresponding to a boundary between pixels; and positioning the point on the right edge to a third grid point on the grid, the third grid point being located at a distance from the second grid point, the distance having sub-pixel precision.

8. A method as recited in claim 6, wherein the step of displaying the character comprises the acts of:

positioning a left side bearing point of the image data to a first point on a grid defined by the pixels of the display device, the first point corresponding to a first boundary between pixels;

positioning a point on a left edge of the stem to a second point on the grid, the second point corresponding to a second boundary between pixels; and positioning a point on a right edge of the stem to a third point on the grid, the third point being selected with sub-pixel precision.

9. In a processing device associated with a display device, wherein the display device has a plurality of pixels each having a plurality of pixel subcomponents and wherein each pixel sub-component within a particular pixel has a color that is different from the other pixel sub-components, a method of using a pixel sub-component precision rendering process to display a document that has been created in association with a full pixel precision rendering process, the method comprising the steps of:

obtaining a document that has been created using a full pixel precision rendering process in which the widths of character features of the character are integer multiples of the width of the pixels, the document including character data that represents a plurality of characters, the characters having first advance widths and the document having an overall formatting and length when displayed using the full pixel precision rendering process;

adjusting a feature of at least some of the characters with pixel sub-component precision; and displaying the document on the display device using a pixel sub-component precision rendering process wherein:

the feature of at least some of the characters is displayed on the display device with a width having a value that is not an integer multiple of the width of the pixels and is different from a width of the selected feature that would be displayed if the selected feature were to be displayed using the full pixel precision rendering process; and the plurality of characters have second advance widths on the display device that are equal to the first advance widths, such that the document maintains the same overall formatting and length when rendered using the pixel sub-component precision rendering process that the document would have if the document were to be rendered using the full pixel precision rendering process.

10. A method as recited in claim 9, wherein the step of displaying the document comprises, for at least some of the plurality of characters, the acts of:

positioning a left side bearing point of the character data associated with the particular character to a first point on a grid defined by the pixels of the display device, the first point corresponding to a first boundary between pixels;

positioning a point on a left edge of a selected feature of the particular character to a second point on the grid, the second point corresponding to a second boundary between pixels; and positioning a point on a right edge of the selected feature to a third point on the grid, the third point being selected with sub-pixel precision.

11. A method as recited in claim 10, wherein the selected feature comprises a stem of the particular character.

12. A computer program product for implementing, in a processing device associated with a display device, wherein the display device has a plurality of pixels each having a plurality of pixel sub-components, wherein each pixel sub-component of a particular pixel has a color that is different from other pixel sub-components of the particular pixel, a method of displaying a character such that a selected feature of the character has a width rendered with pixel sub-component precision, while maintaining an advance width of the character having a value that is an integer multiple of the width of the pixels, the computer program product comprising:

a computer-readable medium carrying executable instructions for performing the method, wherein the method includes the steps of:

obtaining existing image data representing a character having a selected feature, the character having a coarse advance width that is associated with the character when the character is displayed using a full pixel precision rendering process in which the widths of character features of the character are integer multiples of the width of the pixels;

adjusting a width of the selected feature of the character to pixel sub-component precision; and based on the image data, displaying the character on the display device using a pixel sub-component precision rendering process wherein:

the selected feature is rendered with pixel sub-component precision, such that the said adjusted width of the selected feature is different from the width of the selected feature that would be displayed if the selected feature were to be displayed using the full pixel precision rendering process and is not an integer multiple of the width the pixels; and the displayed advance width of the character has a value that is an integer multiple of the width of the pixels and is equal to the coarse advance width, such that the displayed advance width of the character obtained using the pixel sub-component precision rendering process is the same as the coarse advance width that would be obtained if the character were to be rendered using the full pixel precision rendering process.

13. A computer program product as recited in claim 12, wherein the step of displaying the character further comprises the act of mapping spatially different sets of one or more samples of the image data to each of the plurality of pixel sub-components of a particular pixel.

14. A computer program product as recited in claim 12, wherein the step of displaying the character comprises the steps of:
   during runtime, analyzing the topology of the character to identify selected points of the character that are to be fitted to a grid defined by the pixels; and
   positioning the selected points to grind points of the grid such that the width of the selected feature of the character is rendered with pixel sub-component precision and the displayed advance width of the character obtained using the pixel sub-component precision rendering process is the same as the coarse advance width that would be obtained if the character were to be rendered using the full pixel precision rendering process and is an integer multiple of the width of the pixels.

15. A computer program product as recited in claim 12, wherein the selected feature of the character comprises a stem of the character.

16. A computer program product as recited in claim 15, wherein the step of displaying the character comprises the acts of:
   positioning a left side bearing point of the image data to a first point on a grid defined by the pixels of the display device, the first point corresponding to a first boundary between pixels;
   positioning a point on a left edge of the stem to a second point on the grid, the second point corresponding to a second boundary between pixels; and
   positioning a point on a right edge of the stem to a third point on the grid, the third point being selected with sub-pixel precision.

17. A computer program product as recited in claim 15, the method further including the acts of:
   retrieving the image data from a storage volume associated with the processing device, the image data identifying key points of the character and a parent/child hierarchy of the key points, the key points including a left side bearing point, a point on a left edge of the stem, and a point on a right edge of the stem;
   using the parent/child hierarchy:
      positioning the left side bearing point to a first grid point on a grid defined by the pixels, the first grid point corresponding to a boundary between pixels;
      positioning the point on the left edge to a second grid point on the grid, the second grid point corresponding to a boundary between pixels; and
      positioning the point on the right edge to a third grid point on the grid, the third grid point being located a distance from the second grid point, the distance having sub-pixel precision.

18. A computer system comprising:
   a processing unit;
   a display device including a plurality of pixels, each of the plurality of pixels including a plurality of separately controllable pixel sub-components; and
   a computer program product including a computer-readable storage volume carrying executable instructions that, when executed, enable the computer system to implement a method of displaying a character such that a selected feature of the character has a width rendered with pixel sub-component precision, while maintaining an advance width of the character having a value that is an integer multiple of the width of the pixels, the method comprising the steps of:
      obtaining existing image data representing a character having a selected feature, the character having a coarse advance width that is associated with the character when the character is displayed using a full pixel precision rendering process in which the widths of character features of the character are integer multiples of the width of the pixels;
      adjusting a width of the selected feature of the character to pixel sub-component precision; and
      based on the image data, displaying the character on the display device using a pixel sub-component precision rendering process wherein:
         the selected feature is rendered with pixel sub-component precision, such that the said adjusted width of the selected feature is different from the width of the selected feature that would be displayed if the selected feature were to be displayed using the full pixel precision rendering process and is not an integer multiple of the width the pixels; and
         the displayed advance width of the character has a value that is an integer multiple of the width of the pixels and is equal to the coarse advance width, such that the displayed advance width of the character obtained using the pixel sub-component precision rendering process is the same as the coarse advance width that would be obtained if the character were to be rendered using the full pixel precision rendering process.

19. A computer system as recited in claim 18, wherein each of the plurality of pixels includes exactly three separately controllable pixel sub-components, each of a different color.

20. A computer system as recited in claim 19, wherein the plurality of pixel sub-components are arranged on the display device to form vertical stripes of same-colored pixel sub-components.

21. A computer system as recited in claim 18, wherein the step of displaying the character further comprises the act of mapping spatially different sets of one or more samples of the character data to each of the plurality of pixel sub-components of a particular pixel.

22. A computer system as recited in claim 18, wherein the step of displaying the character comprises the steps of:
   during runtime, analyzing the topology of the character to identify selected points of the character that are to be fitted to a grid defined by the pixels; and
   positioning the selected points to grid points of the grid such that the width of the selected feature of the character is rendered with pixel sub-component precision and the displayed advance width of the character obtained using the pixel sub-component precision rendering process is the same as the coarse advance width that would be obtained if the character were to be rendered using the full pixel precision rendering process and is an integer multiple of the width of the pixels.

23. A computer system as recited in claim 18, wherein selected feature of the character comprises a stem of the character.

24. A computer system as recited in claim 23, wherein the step of displaying the character comprises the acts of:
   positioning a left side bearing point of the character data to a first point on a grid defined by the pixels of the display device, the first point corresponding to a first boundary between pixels;
   positioning a point on a left edge of the stem to a second point on the grid, the second point corresponding to a second boundary between pixels; and
   positioning a point on a right edge of the stem to a third point on the grid, the third point being selected with sub-pixel precision.

25. A computer system as recited in claim 23, the method further including the acts of:
   retrieving the character data from a storage volume associated with the processing device, the character data identifying key points%of the character and a parent/child hierarchy of the key points, the key points including a left side bearing point, a point on a left edge of the stem, and a point on a right edge of the stem;
   using the parent/child hierarchy:
      positioning the left side bearing point to a first grid point on a grid defined by the pixels, the first grid point corresponding to a boundary between pixels;
      positioning the point on the left edge to a second grid point on the grid, the second grid point corresponding to a boundary between pixels; and
      positioning the point on the right edge to a third grid point on the grid, the third grid point being located a distance from the second grid point, the distance having sub-pixel precision.

26. In a processing device associated with a display device, wherein the display device has a plurality of pixels each having a plurality of pixel sub-components, a method of displaying a character such that a stem of the character has a width rendered with pixel sub-component precision, while maintaining an advance width of the character having a value that is an integer multiple of the width of the pixels, the method comprising the steps of:
   retrieving image data representing a character having a stem from a storage volume associated with the processing device, the image data identifying key points of the character and a parent/child hierarchy of the key points, the key points including a left side bearing point, a point on a left edge of the stem, and a point on a right edge of the stem, wherein the character has a coarse advance width;
   using the parent/child hierarchy:
      positioning the left side bearing point to a first grid point on a grid defined by the pixels, the first grid point corresponding to a boundary between pixels;
      positioning the point on the left edge to a second grid point on the grid, the second grid point corresponding to a boundary between pixels; and
      positioning the point on the right edge to a third grid point on the grid, the third grid point being located at a distance from the second grid point, the distance having pixel sub-component precision; and
   based on the image data, displaying the character on the display device using a pixel sub-component precision rendering process wherein the selected feature is rendered with pixel sub-component precision and the displayed advance width of the character has a value that is an integer multiple of the width of the pixels and is equal to the coarse advance width.

27. A method as recited in claim 26, further comprising acts of:
   positioning a left side bearing point of the image data to a first point on a grid defined by the pixels of the display device, the first point corresponding to a first boundary between pixels;
   positioning a point on a left edge of the stem to a second point on the grid, the second point corresponding to a second boundary between pixels; and
   positioning a point on a right edge of the stem to a third point on the grid, the third point being selected with sub-pixel precision.

28. A method as recited in claim 26, wherein the step of obtaining image data comprises the act of accessing the image data from a document that has been created by a user in association with the full pixel precision rendering process.

29. A method as recited in claim 28, wherein the step of displaying the character on the display device is performed such that the formatting of the document is preserved, the step of displaying the document including the step of displaying the character.

30. In a processing device associated with a display device, wherein the display device has a plurality of pixels each having a plurality of pixel sub-components a method of fitting character data to a grid defined by the pixels in preparation for rendering an image on the display device, the method comprising the acts of:
   obtaining character data representing a character having a stem;
   positioning a selected point located on a first edge of the stem, a left side bearing point of the character, and a right side bearing point of the character at: grid points on the grid that correspond to boundaries between pixels on the display device, wherein the left side bearing point is positioned to a first grid point that corresponds to a specified boundary between pixels;
   determining a coarse advance width of the character that would be generated if the character were to be displayed using a full pixel precision rendering process;
   positioning a point on a second edge of the stem on the grid such that a width of the stem has a value having pixel sub-component precision, the second edge being opposite the first edge; and
   positioning the right side bearing point to a second grid point such that the left side bearing point and the right side bearing point are separated by a distance equal to the coarse advance width.

31. A method as recited in claim 30, wherein the first edge of the stem is the left edge of the stem and the second edge of the stem is the right edge of the stem.

32. A method as recited in claim 30, further comprising the act of analyzing the topology of the character at runtime to identify the selected point located on the first edge of the stem.

33. A method as recited in claim 30, further comprising the act of analyzing a directed acyclic graph that defines the selected point on the first edge of the stem, the left side bearing point, the right side bearing point, and the point on the second edge of the stem.

34. In a processing device associated with a display device, wherein the display device has a plurality of pixels each having a plurality of pixel sub-components, a method of using a pixel sub-component precision rendering process to display a document that has been created in association with a full pixel precision rendering process, the method comprising the steps of:
   obtaining a document that has been created using a full pixel precision rendering process, the document including character data that represents a plurality of characters, the characters having first advance widths when displayed using the full pixel precision rendering process;

positioning a left side bearing point of the character data associated with a particular character to a first point on a grid defined by the pixels of the display device, the first point corresponding to a first boundary between pixels;

positioning a point on a left edge of a selected feature of the particular character to a second point on the grid, the second point corresponding to a second boundary between pixels;

positioning a point on a right edge of the selected feature to a third point on the grid, the third point being selected with sub-pixel precision; and displaying the document on the display device using a pixel sub-component precision rendering process whereby the selected feature of at least some of the characters is displayed on the display device with a width having a value that is not an integer multiple of the width of the pixels, the plurality of characters having second advance widths on the display device that are equal to the first advance widths.

* * * * *

UNITED STATES PATENT AND TRADEMARK OFFICE
CERTIFICATE OF CORRECTION

PATENT NO. : 6,377,262 B1
DATED : April 23, 2002
INVENTOR(S) : Gregory C. Hitchcock, Beat Stamm, Claude Betrisey and Matt Conway It is certified that error appears in the above-identified patent and that said Letters Patent is hereby corrected as shown below:

Column 2,
Line 1, after "Thus" insert -- , --
Line 13, after "particularly evident in flat" change "pane)" to -- panel --

Column 3,
Line 2, before "device" change "displays" to -- display --
Line 60, after "Understanding that these" change "drawing" to -- drawings --

Column 5,
Line 12, after "the pixels of the" change "TCD" to -- LCD --
Line 38, after "When information" change "I" to -- is --

Column 6,
Line 56, after "are often connected to" change "he" to -- the --

Column 7,
Line 34, after "system configuration" change "Is" to -- is --

Column 9,
Line 13, after "bearing point 116" change "aid" to -- and --
Line 39, after "coordinate position" change "(of 13.6, 1.2)" to -- of (13.6, 1.2) --

Column 15,
Line 23, after "White widths are" change "open" to -- often --
Line 46, before "of an immediately" change "joint" to -- point --
Line 60, after "FIG. 11*b*," change "file" to -- the --
Line 65, before "filed on the same" change "09,546,139" to -- 09/546,139 --

Column 17,
Line 15, after "(e.g., each" change "samples" to -- sample --

UNITED STATES PATENT AND TRADEMARK OFFICE
CERTIFICATE OF CORRECTION

PATENT NO. : 6,377,262 B1
DATED : April 23, 2002
INVENTOR(S) : Gregory C. Hitchcock, Beat Stamm Claude Betrisey and Matt Conway It is certified that error appears in the above-identified patent and that said Letters Patent is hereby corrected as shown below:

Column 18,
Line 11, after "a plurality of pixel" change "subcomponents" to -- sub-components --
Line 56, after "in claim 3" change "in" to -- wherein --

Column 23,
Line 17, after "identifying key points" remove "%"

Signed and Sealed this

Eighth Day of October, 2002

*Attest:*

JAMES E. ROGAN
*Attesting Officer*     *Director of the United States Patent and Trademark Office*